(12) United States Patent
Shigeta et al.

(10) Patent No.: US 10,209,770 B2
(45) Date of Patent: *Feb. 19, 2019

(54) INFORMATION PROCESSING APPARATUS AND INFORMATION PROCESSING METHOD

(71) Applicant: SONY CORPORATION, Tokyo (JP)

(72) Inventors: Osamu Shigeta, Tokyo (JP); Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,717

(22) Filed: Feb. 7, 2018

(65) Prior Publication Data

US 2018/0164875 A1 Jun. 14, 2018

Related U.S. Application Data

(63) Continuation of application No. 15/612,487, filed on Jun. 2, 2017, now Pat. No. 9,933,848, which is a (Continued)

(30) Foreign Application Priority Data

Nov. 9, 2012 (JP) .................................. 2012-247940

(51) Int. Cl.
*G06F 3/01* (2006.01)
*G06F 3/0482* (2013.01)
(Continued)

(52) U.S. Cl.
CPC .............. *G06F 3/011* (2013.01); *G06F 3/017* (2013.01); *G06F 3/0304* (2013.01);
(Continued)

(58) Field of Classification Search
None
See application file for complete search history.

(56) References Cited

U.S. PATENT DOCUMENTS 6,308,199 B1 * 10/2001 Katsurabayashi .... G06F 3/0481
709/203
2007/0242813 A1 10/2007 Horikiri et al.
(Continued)

FOREIGN PATENT DOCUMENTS

CN 101479693 A 7/2009
CN 101056386 A 10/2017
(Continued)

OTHER PUBLICATIONS

Notice of Allowance for U.S. Appl. No. 15/612,487, dated Dec. 19, 2017, 05 pages.
(Continued)

*Primary Examiner* — Martin Mushambo
(74) *Attorney, Agent, or Firm* — Chip Law Group

(57) ABSTRACT

There is provided an information processing apparatus that controls display of a virtual object displayed in an extended work space in which a real object and the virtual object are operable, the information processing apparatus including an operation deciding unit configured to decide an operation process to the virtual object displayed in the extended work space on the basis of a result of analysis of input information to the extended work space, the analysis being based on position information of an information terminal detected in the extended work space and display control trigger information for changing display of the virtual object, and a display control unit configured to execute a display control process of the virtual object on the basis of the decided operation process.

22 Claims, 20 Drawing Sheets

Related U.S. Application Data continuation of application No. 14/440,383, filed as application No. PCT/JP2013/078100 on Oct. 16, 2013, now Pat. No. 9,753,534.

(51) Int. Cl.

| | | |
|---|---|---|
| *G06F 3/03* | (2006.01) | |
| *G06F 3/0488* | (2013.01) | |
| *H04L 29/06* | (2006.01) | |
| *G06F 3/14* | (2006.01) | |

(52) U.S. Cl.
CPC ........ *G06F 3/0488* (2013.01); *H04L 65/1059* (2013.01); *G06F 3/1454* (2013.01); *H04L 29/06401* (2013.01)

(56) References Cited

U.S. PATENT DOCUMENTS

| | | | | |
|---|---|---|---|---|
| 2007/0266185 | A1 | 11/2007 | Goddi et al. | |
| 2008/0238954 | A1* | 10/2008 | Hasuike | G06F 3/0421 345/698 |
| 2009/0046140 | A1* | 2/2009 | Lashmet | G09G 3/002 348/51 |
| 2011/0248983 | A1* | 10/2011 | Kim | G03B 21/14 345/212 |
| 2011/0254860 | A1* | 10/2011 | Zontrop | G06T 19/006 345/633 |
| 2012/0017147 | A1* | 1/2012 | Mark | G06F 1/1639 715/702 |
| 2012/0206452 | A1* | 8/2012 | Geisner | G02B 27/017 345/419 |
| 2012/0250940 | A1* | 10/2012 | Kasahara | G06F 3/011 382/103 |
| 2013/0050258 | A1* | 2/2013 | Liu | G02B 27/017 345/633 |
| 2013/0050432 | A1* | 2/2013 | Perez | H04N 13/0278 348/47 |
| 2013/0083064 | A1* | 4/2013 | Geisner | G06F 17/30047 345/633 |
| 2013/0222410 | A1* | 8/2013 | Kameyama | G06T 19/006 345/589 |
| 2013/0307875 | A1* | 11/2013 | Anderson | G06T 19/006 345/633 |
| 2014/0016825 | A1* | 1/2014 | Kasahara | G06T 11/00 382/103 |
| 2015/0029223 | A1* | 1/2015 | Kaino | G06T 19/006 345/633 |

FOREIGN PATENT DOCUMENTS

| | | |
|---|---|---|
| JP | 06-075735 A | 3/1994 |
| JP | 07-049936 A | 2/1995 |
| JP | 11-065975 A | 3/1999 |
| JP | 2005-031448 A | 2/2005 |
| JP | 2008-242367 A | 10/2008 |
| JP | 2009-534751 A | 9/2009 |
| JP | 2010-238098 A | 10/2010 |
| KR | 10-2008-0109869 A | 12/2008 |
| WO | 2007/124122 A2 | 4/2007 |

OTHER PUBLICATIONS

Notice of Allowance for U.S. Appl. No. 15/612,487, dated Nov. 3, 2017, 07 pages.

Notice of Allowance for U.S. Appl. No. 15/612,487, dated Jul. 3, 2017, 07 pages.

Office Action for JP Patent Application No. 2014-545627, dated Sep. 5, 2017, 04 pages of Office Action and 03 pages of English Translation.

Office Action for CN Patent Application No. 201380057285.6, dated May 22, 2017, 10 pages of Office Action and 12 pages of English Translation.

Office Action for JP Patent Application No. 2014-545627, dated May 23, 2017, 05 pages of Office Action and 04 pages of English Translation.

Corrected Notice of Allowability in U.S. Appl. No. 14/440,383 dated Jul. 11, 2017.

Non-Final Rejection for U.S. Appl. No. 14/440,383, dated May 9, 2016, 08 pages.

Final Rejection for U.S. Appl. No. 14/440,383, dated Nov. 17, 2016, 10 pages.

Notice of Allowance and Fees Due for U.S. Appl. No. 14/440,383, dated Mar. 2, 2017, 09 pages.

International Search Report and Written Opinion in PCT/JP2013/078100, dated Jan. 14, 2014, 9 pages and 08 pages of English translation.

International Preliminary Report on Patentability of PCT Application No. PCT/JP2013/078100, dated May 21, 2015, 08 pages of English Translation and 06 pages of IPRP.

Notice of Allowance for U.S. Appl. No. 14/440,383, dated Aug. 1, 2017, 05 pages.

Office Action for EP Patent Application No. 13852761.9, dated Oct. 16, 2018, 07 pages of Office Action.

* cited by examiner

FIG. 7
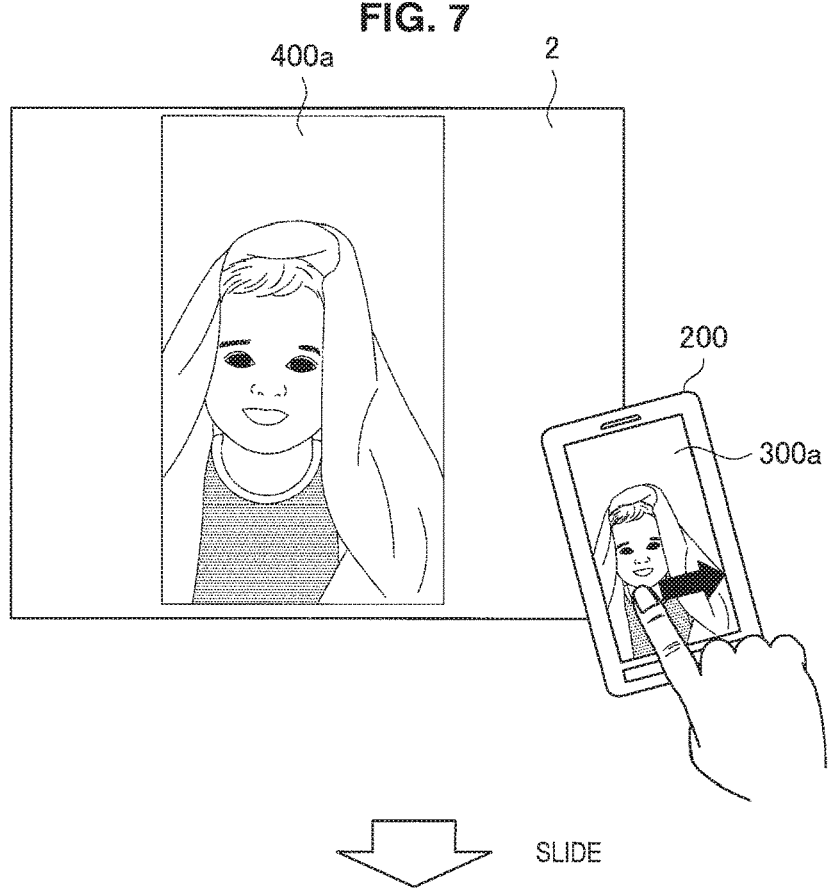
SLIDE
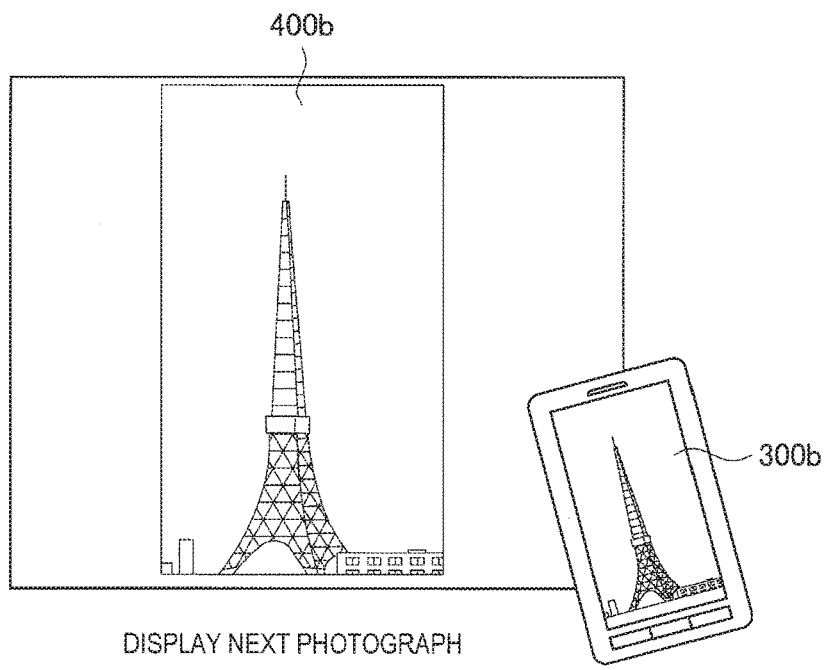
DISPLAY NEXT PHOTOGRAPH

FIG. 8
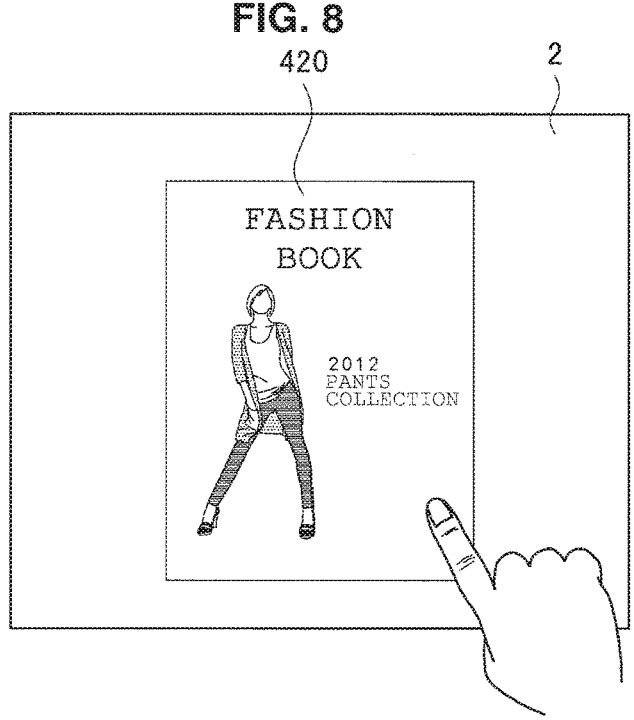
SLIDE
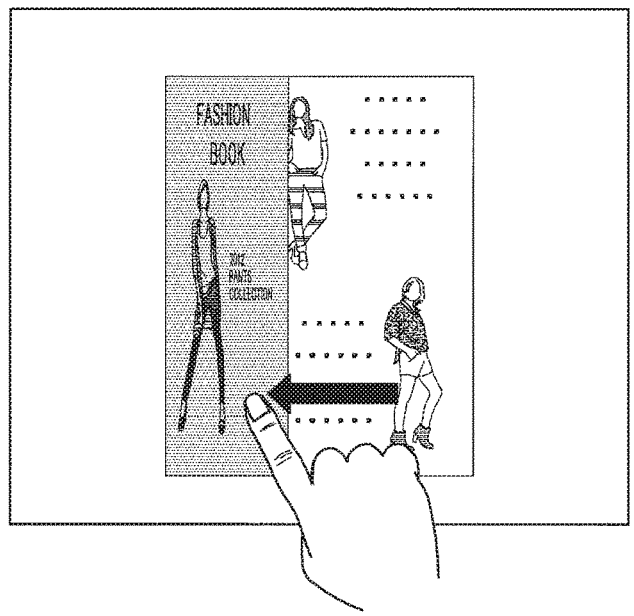
NEXT PAGE

FIG. 9
<SLIDE OPERATION>          <BAR CODE UTILIZATION>
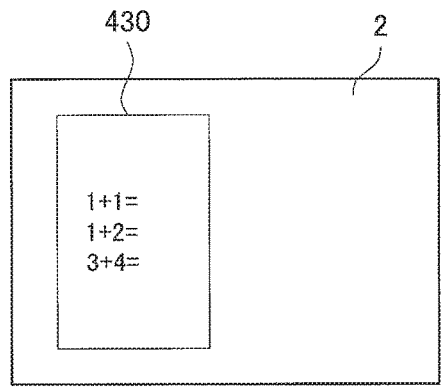 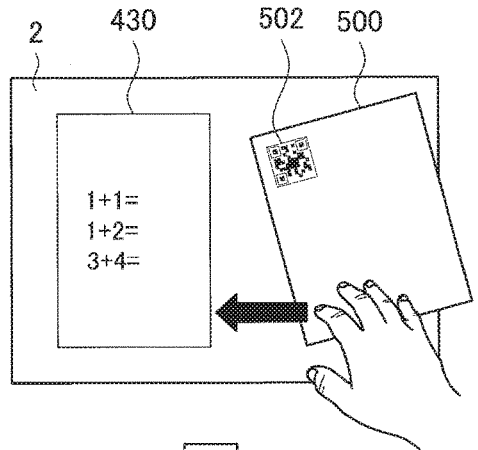
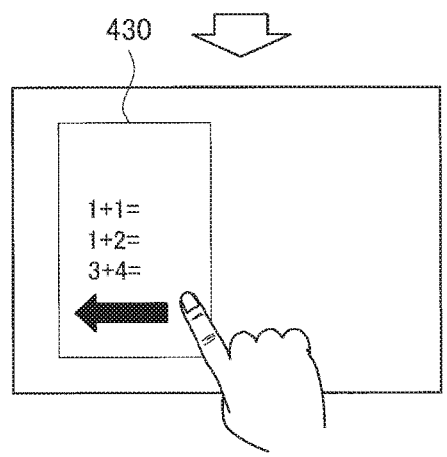 
PERFORM ACTION OF SLIDING TO TURN ANSWER SHEET
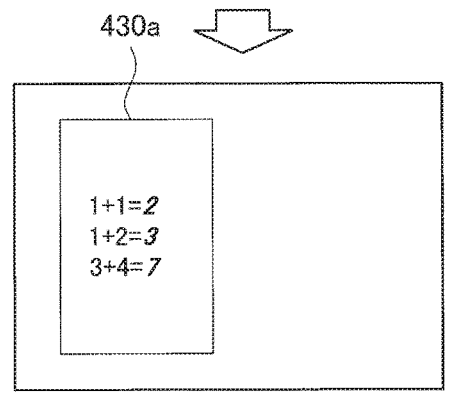 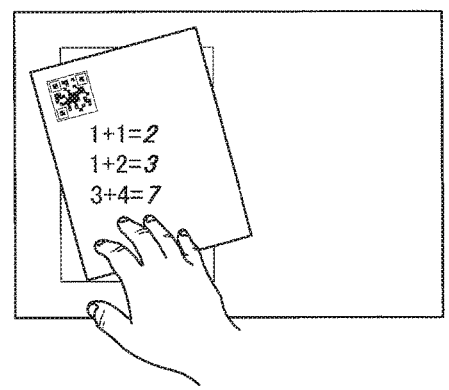
DISPLAY ANSWER          DISPLAY ANSWER FIG. 15
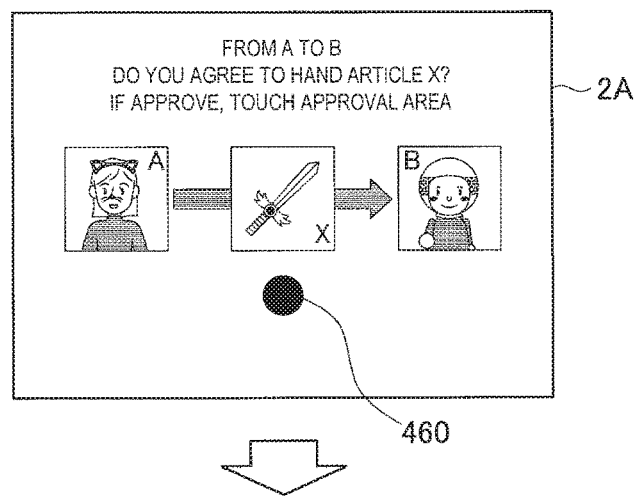
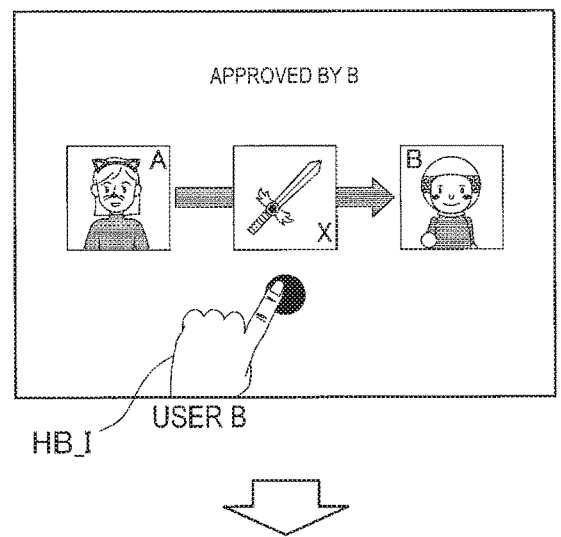
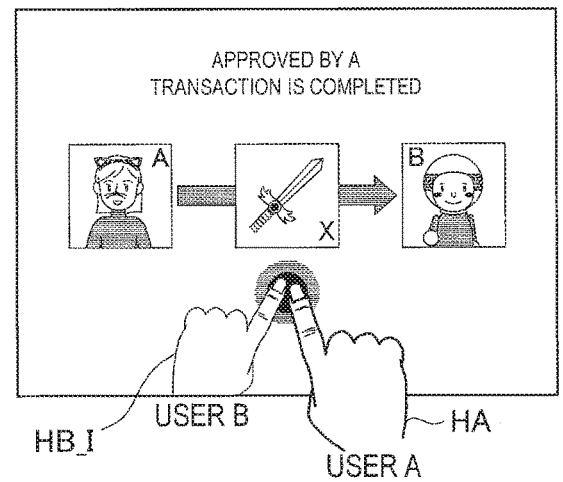

INFORMATION PROCESSING APPARATUS AND INFORMATION PROCESSING METHOD

CROSS REFERENCE TO RELATED APPLICATIONS

The present application is a continuation application of U.S. patent application Ser. No. 15/612,487, filed Jun. 2, 2017, which is a continuation application of U.S. patent application Ser. No. 14/440,383, filed May 4, 2015, which is a National Stage of PCT/JP2013/078100, filed Oct. 16, 2013, and claims the benefit of priority from prior Japanese Patent Application JP 2012-247940, filed Nov. 9, 2012, the entire content of which is hereby incorporated by reference.

TECHNICAL FIELD

The present disclosure relates to an information processing apparatus, an information processing method, and a computer-readable recording medium.

BACKGROUND ART

Action with an actually touchable real object, such as writing characters on a paper with a pen, cutting a cooking ingredient in a kitchen, and playing a card game, is unable to be performed in the same space as action using digital information with a personal computer or a smartphone, for example. However, it is anticipated that, in future, digital information is superimposed on a real world using a projector for example, to enable a work in a space which integrates a real world and a digital information world. Some examples are writing a formula on a paper to automatically generate a graph and projecting a cut line on a cooking ingredient to cut it appropriately according to a recipe. AR application for realizing such processes is, for example, the technology disclosed in Patent Literature 1 and others.

A preceding technology that presents digital information of a virtual object on a real world is, for example, a technology using a projector, a head mount display (HMD) of a see-through type, a camera-equipped display such as a smartphone, or the like. In the following, such work space that integrates a real world and digital information is referred to as "extended work space".

CITATION LIST

Patent Literature

Patent Literature 1: JP 2010-238098A

SUMMARY OF INVENTION

Technical Problem

A work performed in an extended work space is, for example, handling digital information, such as weather, news, clock, and photograph, in an extended work space by projecting them on a desk or a wall. In this case, an application is selected and activated from a home screen image of a smartphone, a tablet terminal, and a personal computer, or the like, and intended digital information is projected to enable handling of digital information in an extended work space. However, to handle intended digital information in an extended work space, one has to switch to the home screen image and select the application every time. Another method is, for example, to activate a specific application from a smartphone and forward digital information to another device. However, one has to select a device to which to digital information is forwarded, from a complicated hierarchical menu structure.

Thus, the present disclosure proposes a novel and improved information processing apparatus, an information processing method, and a computer-readable recording medium, which enables handling of digital information in an extended work space that integrates a real world and digital information by a simple and intuitive method.

Solution to Problem

According to the present disclosure, there is provided an information processing apparatus that controls display of a virtual object displayed in an extended work space in which a real object and the virtual object are operable, the information processing apparatus including an operation deciding unit configured to decide an operation process to the virtual object displayed in the extended work space on the basis of a result of analysis of input information to the extended work space, the analysis being based on position information of an information terminal detected in the extended work space and display control trigger information for changing display of the virtual object, and a display control unit configured to execute a display control process of the virtual object on the basis of the decided operation process.

According to the present disclosure, when a predetermined action is performed using an information terminal in an extended work space, display control of a virtual object of a control target is executed between an information processing apparatus and the information terminal. This provides a user interface that enables a user to operate by a simple and intuitive method.

According to the present disclosure, there is provided an information processing method of controlling display of a virtual object displayed in an extended work space in which a real object and the virtual object are operable, the information processing method including deciding an operation process to the virtual object displayed in the extended work space, on the basis of a result of analysis of input information to the extended work space, the analysis being based on position information of an information terminal detected in the extended work space and display control trigger information for changing display of the virtual object, and executing a display control process of the virtual object on the basis of the decided operation process.

Further, the present disclosure provides a computer-readable storage medium having a program stored therein, the program causing a computer to function as the above information processing apparatus.

Advantageous Effects of Invention

As described above, according to the present disclosure, an information processing apparatus, an information processing method, and a computer-readable recording medium, which enables handling of digital information in an extended work space that integrates a real world and digital information by a simple and intuitive method, is provided.

BRIEF DESCRIPTION OF DRAWINGS

FIG. 7 is an explanatory diagram illustrating an example of synchronization, when synchronizing digital information displayed in an extended work space and digital information of an information terminal.

FIG. 8 is an explanatory diagram illustrating an exemplary operation for recognizing a real object in an extended work space and displaying digital information associated with recognized information on a work surface of an extended work space.

FIG. 9 is an explanatory diagram illustrating an another exemplary operation for recognizing a real object in an extended work space and displaying digital information associated with recognized information on a work surface of an extended work space.

FIG. 15 is an explanatory diagram illustrating another example of an authentication method according to the same embodiment.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted. Note that description will be made in the following order.

1. First Embodiment (Transfer of Digital Information)
1.1. Exemplary Configuration of Extended Work Space System
1.2. Function and Configuration of Information Recognition Display Device
1.3. Work in Extended Work Space
2. Second Embodiment (Remote Collaboration Function)
2.1. Remote Collaboration Function
2.2. Interactive authentication Method
3. Hardware Configuration Example <1. First Embodiment>

[1.1. Exemplary Configuration of Extended Work Space System]

Figure 1:
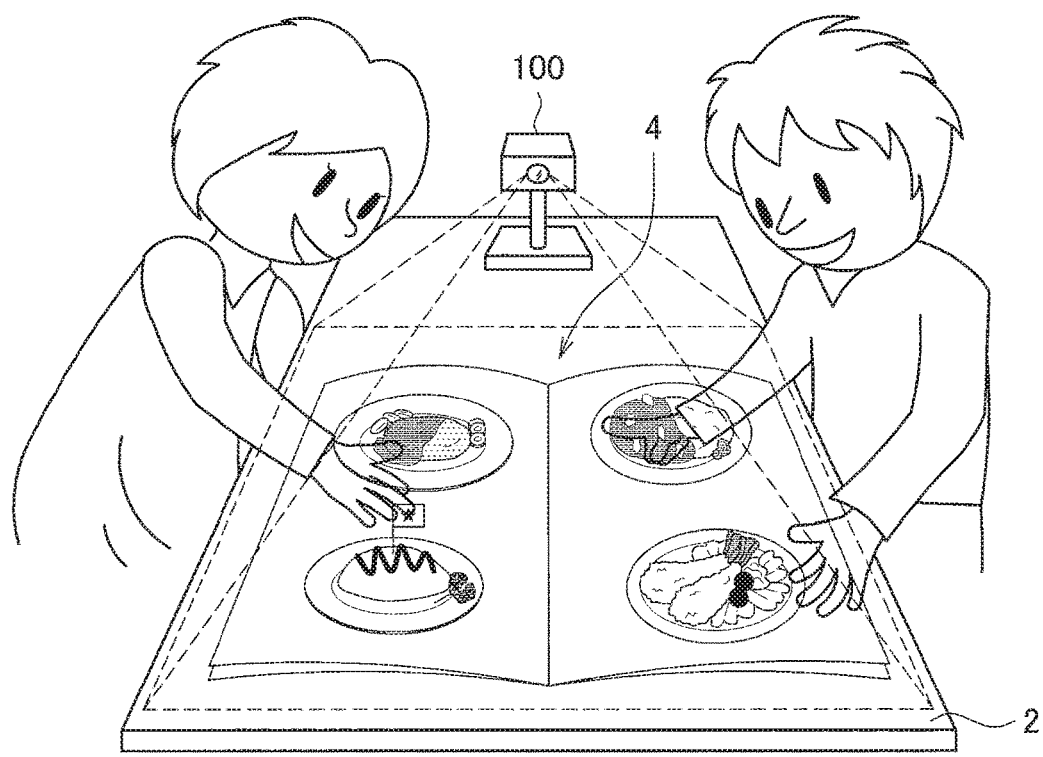
FIG. 1 is an explanatory diagram illustrating an exemplary configuration of an extended work space system according to a first embodiment of the present disclosure.

First, with reference to FIG. 1, an exemplary configuration of an extended work space system according to the first embodiment of the present disclosure will be described. FIG. 1 is an explanatory diagram illustrating an exemplary configuration of the extended work space system according to the present embodiment.

The extended work space system according to the present embodiment is a system that recognizes a real object that is present in the real world, and superimposes digital information of a virtual object in the real world, and constructs an extended work space in which the real world and digital information are integrated. The extended work space system includes for example, a projector that projects digital information in the extended work space, a camera that takes an image of the extended work space, a sensing device that recognizes a gesture such as touch, pinch in, and pinch out, performed in the extended work space, and a wireless communication device.

For example, as illustrated in FIG. 1, a tabletop is used as a work surface 2, and an information recognition display device 100 including the projector, the camera, the wireless communication device, and the sensing device is installed on the tabletop to project digital information on the work surface 2, for the purpose of constructing an extended work space. The work surface 2 is an information operation surface on which operation and display of information are performed in the extended work space, and is a region on which the projector can project an image and of which the camera can capture an image. The information recognition display device 100 takes an image of a space including the work surface 2 with the camera, and recognizes a user's gesture performed on the work surface 2 by the sensing device. Also, the projector projects digital information on the work surface 2 to superimpose digital information on an object that is present in the real world.

Although in the extended work space system, the information recognition display device 100 including the projector is installed on the tabletop to project digital information on the work surface 2 in an example of FIG. 1, the projector may be installed on a desk light stand on a tabletop, a ceiling light, a wall, or the like. Also, instead of projecting digital information by the projector, a device of a glasses type such as a camera-equipped head mount display (HMD) and a HMD of a see-through type may be used, for example. In this case, the digital information superimposed in the extended work space is superimposed on the display of the glasses type which is worn by a user. Also, as an alternative of the projector, a device such as a smartphone including a camera and a display may be used to superimpose and display digital information on a through-the-lens image that is captured by the camera and displayed on the display.

Also, the sensing device may be, for example, an IR camera that detects infrared light projected parallelly onto the work surface 2, a stereo camera, a special sensor capable of acquiring depth information, or the like. Also, the sensing device may be a touch sensor that detects a contact of a finger or the like to the work surface 2, and a device capable of acquiring coordinates of a writing trajectory by a digital pen using ultrasonic wave and infrared light. Note that the coordinates of the writing trajectory may be detected by detecting a writing trajectory of a normal pen with another sensor such as a camera, without using the digital pen.

The wireless communication device is, for example, a device capable of communicating with an external device such as Bluetooth (registered trademark), Wi-Fi (registered trademark), and NFC (Near Field Communication).

[1.2. Function and Configuration of Information Recognition Display Device]

Figure 2:
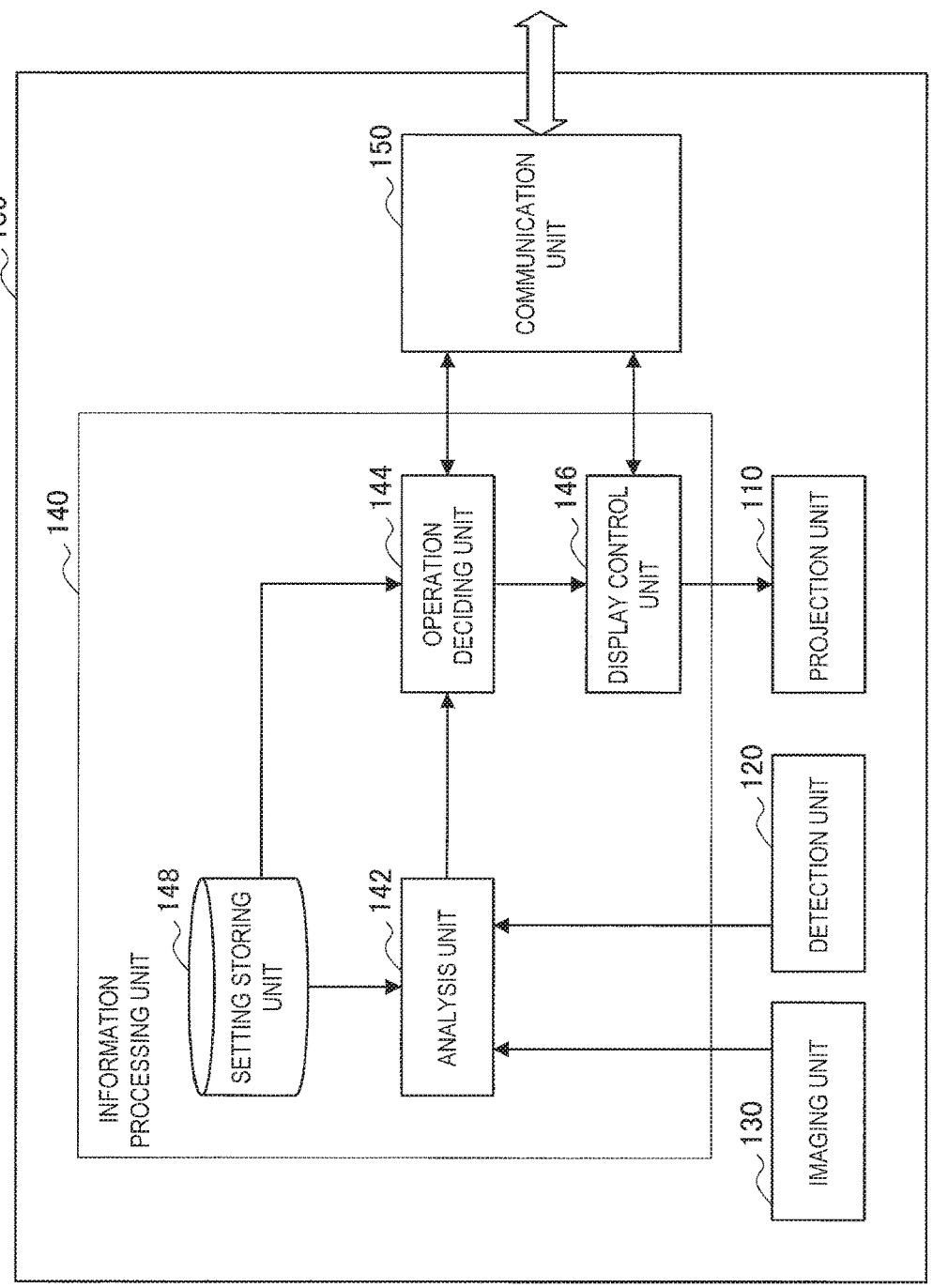
FIG. 2 is a block diagram illustrating a function and configuration of an information recognition display device according to the same embodiment.

Next, on the basis of FIG. 2, function and configuration of the information recognition display device 100 will be described. FIG. 2 is a block diagram illustrating the function and configuration of the information recognition display device 100 according to the present embodiment. The information recognition display device 100 according to the present embodiment includes a projection unit 110, a detection unit 120, an imaging unit 130, an information processing unit 140, and a communication unit 150.

The projection unit 110 is a function unit that projects digital information in the extended work space, and is configured by the projector or the like described in FIG. 1. The projection unit 110 receives a display instruction from the information processing unit 140 described later, and displays digital information in the extended work space in which the projection unit 110 is installed.

The detection unit 120 detects motion information in the extended work space. The detection unit 120 is configured by the sensing device or the like described in FIG. 1, for example. The detection unit 120 outputs a detection result to the information processing unit 140 described later.

The imaging unit 130 is a function unit that takes an image of the extended work space, and is configured by the camera or the like described in FIG. 1. The imaging unit 130 outputs a shot image to the information processing unit 140 described later.

The information processing unit 140 analyzes position and motion of an object in the extended work space, and executes a display process of digital information in the extended work space in response to the analysis result. The information processing unit 140 includes a setting storing unit 148, a display control unit 146, an operation deciding unit 144, and an analysis unit 142, as illustrated in FIG. 2.

The analysis unit 142 analyzes position and motion of an object in the extended work space on the basis of information of at least one of a detection result of the detection unit 120 and a shot image by the imaging unit 130. For example, the analysis unit 142 calculates a change in the motion of a hand of a user from a detection result by the detection unit 120. Then, the analysis unit 142 identifies a gesture, such as touch and pinch in, and pinch out, which a user performs in the extended work space, from the identified change of the motion of a hand of a user with reference to the setting storing unit 148. The analysis result by the analysis unit 142 is operation input information that a user performs in the extended work space, and digital information is displayed in a virtual work space on the basis of the analysis result. The analysis unit 142 outputs an analysis result to the operation deciding unit 146.

The operation deciding unit 144 decides an operation method of digital information in the extended work space, on the basis of the analysis result of the analysis unit 142. For example, the operation deciding unit 144 decides the operation method of digital information corresponding to a user's gesture identified by the analysis unit 142, with reference to the setting storing unit 148. The operation method of the digital information is, for example, copying digital information of an information terminal to the work surface 2, moving digital information of the work surface 2 to an information terminal, scale-up and scale-down of digital information displayed on the work surface 2, or the like. The operation deciding unit 144 outputs the decided operation method to the display control unit 146.

The display control unit 146 executes a display process of digital information in the extended work space, on the basis of the operation method decided by the operation deciding unit 144. For example, the display control unit 146 executes a display process for displaying a transfer of digital information between an information terminal and the work surface 2, a display change process of digital information displayed in the extended work space (scale-up, scale-down, moving etc.), and the like. The display control unit 146 outputs a display process method of digital information to the projection unit 110, to instruct display of digital information.

The setting storing unit 148 stores information for deciding analysis executed in the information processing unit 140, an operation method of digital information, or the like. For example, with reference to information stored in the setting storing unit 148, the analysis unit 142 identifies operation input information that a user performs in the extended work space, and the operation deciding unit 144 decides the operation method of digital information in the extended work space.

The communication unit 150 transmits information to and receives information from the information recognition display device 100 of another extended work space. The communication unit 150 enables information to be exchanged with the information recognition display device 100 of another extended work space, so that each extended work space mutually reflects the situation of another extended work space.

[1.3. Work in Extended Work Space]

The information recognition display device 100 according to the present embodiment is a device that controls operation of a real object in the extended work space and digital information in an information terminal in response to operation input information input in the extended work space. The information recognition display device 100 executes a control to enable simple and intuitive handling of digital information, for the purpose of removing complicated operations and efforts that has occurred when handling digital information in the extended work space in the past.

Figure 3:
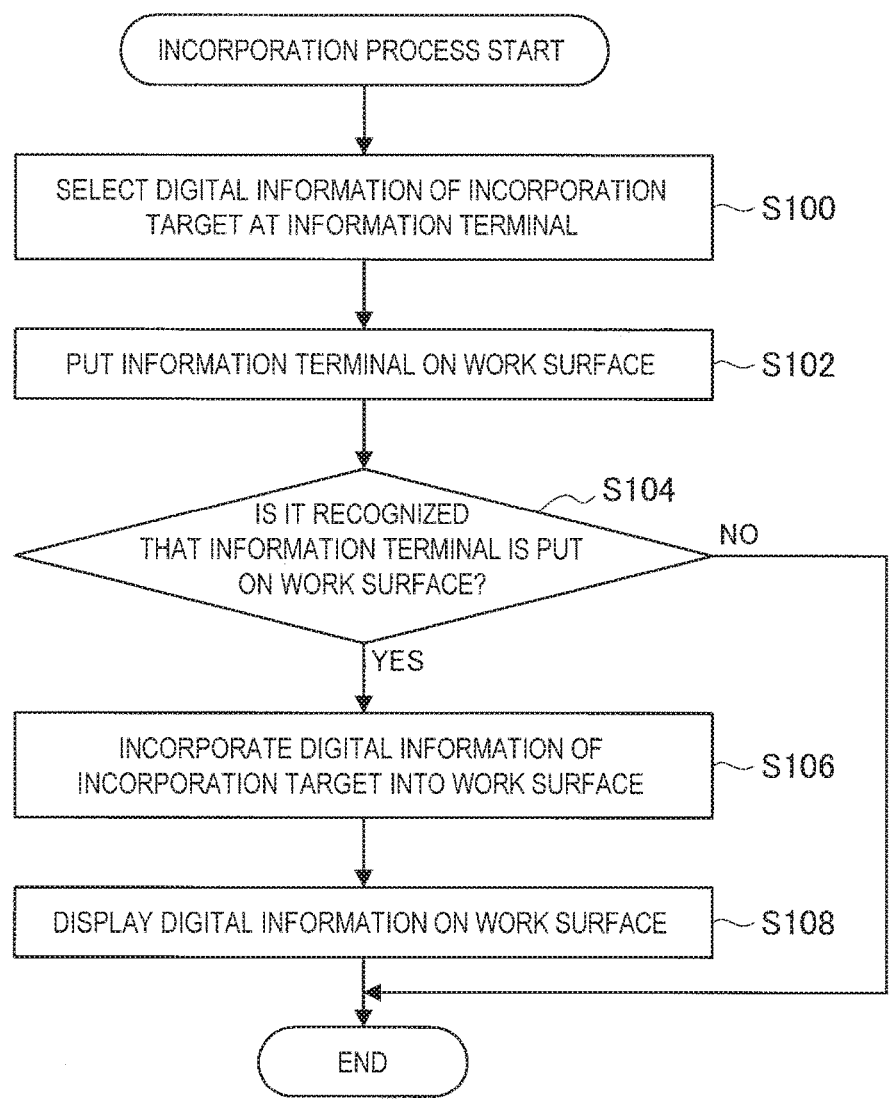
FIG. 3 is a flowchart illustrating an incorporation process of digital information from an information terminal to an extended work space.
Figure 4:
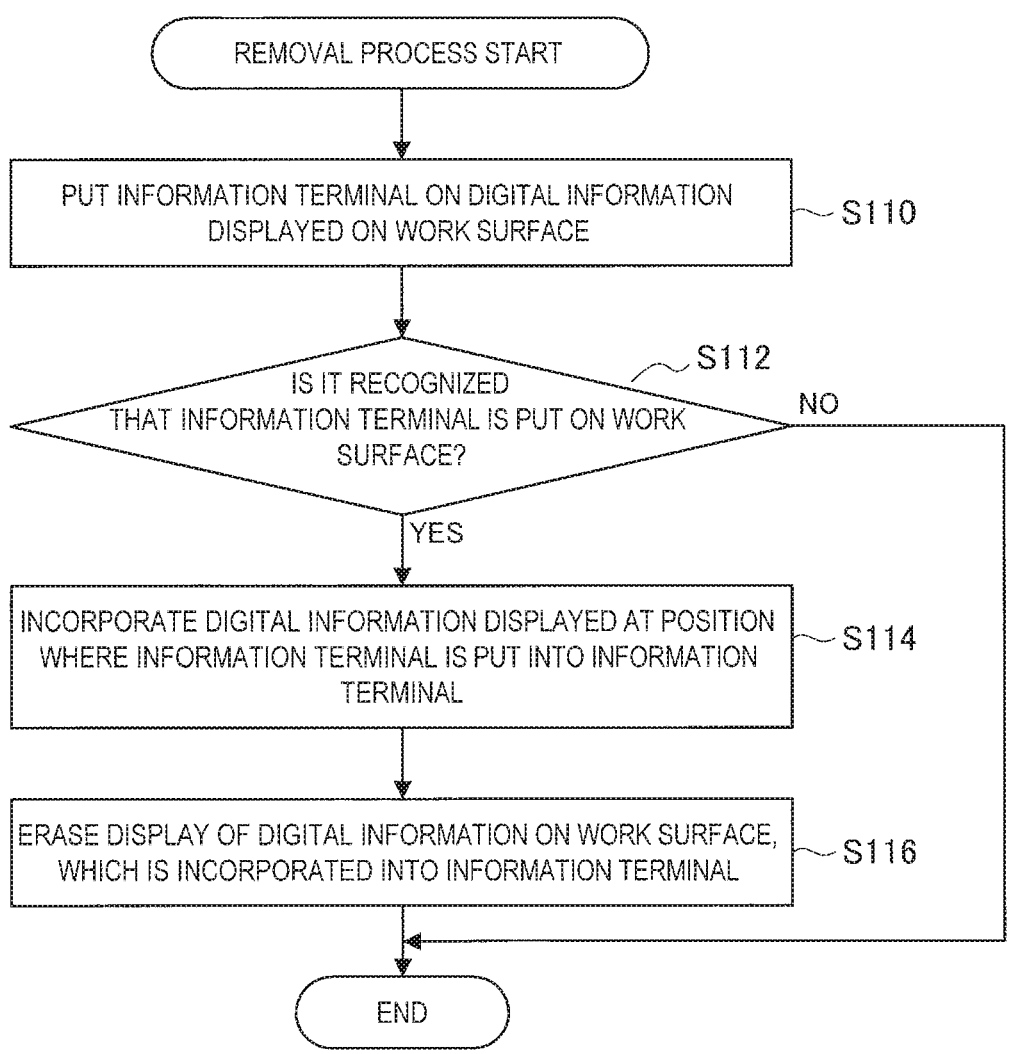
FIG. 4 is a flowchart illustrating a removal process of digital information displayed on a work surface from an extended work space to an information terminal.

First, on the basis of FIGS. 3 to 5, a transfer process of digital information performed between the work surface in the extended work space 2 and the information terminal, which is a basic process by the information recognition display device 100, will be described. FIG. 3 is a flowchart illustrating an incorporation process of digital information from the information terminal 200 to the extended work space. FIG. 4 is a flowchart illustrating a removal process of digital information displayed on the work surface from the extended work space to the information terminal 200. FIG.

5 is an explanatory diagram for describing a photograph transferring process performed between the work surface in the extended work space 2 and the information terminal 200.

When digital information is able to be transferred between the work surface in the extended work space 2 and the information terminal 200, work such as editing can be performed at a site where operation of digital information is easy, and digital information can be incorporated into the portable information terminal 200 after completion of the work. Note that, the information terminal 200 is, for example, a device such as a smartphone, a tablet terminal, and a digital camera.

The information terminal 200 has a limited operation region, while being capable of creating a spacious work surface 2 in the extended work space. Accordingly, for example, when editing a plurality of images stored in the information terminal 200, only an editing target image is displayed and edited one by one in the information terminal 200, due to the limitation of the operation region. Thus, images stored in the information terminal 200 are incorporated on the work surface 2, and the incorporated images are spread on the work surface 2, in order to enable a person to simultaneously edit images while looking at different images. In addition, work of digital information utilizing the extended work space is particularly effective, when a large work space is to be provided, such as when a plurality of persons browse and share photographs, or when a message is written on a screen image.

Note that, in the following, digital information can be various information including content such as moving image and sound, an information posting service such as twitter (registered trademark), an application such as clock, news, game, and the like. Also, the digital information selected in the information terminal 200 may be stored in the main body of the information terminal 200, or may be stored in a server connected to the information terminal 200 via a network in a communicable manner, like cloud computing. The information recognition display device 100 of the extended work space and the information terminal 200 are in advance connected to each other by wireless communication. Pairing of these devices may be conducted by a past setting method using the setting screen image of the operation terminal, or may be conducted by touch pairing in which pairing is automatically conducted by contacting the information terminal 200 that is to be paired on the information recognition display device 100.

(1) Digital Information Incorporation Process

First, a process for incorporating digital information selected in the information terminal 200 from the information terminal 200 into the work surface in the extended work space 2 will be described. As illustrated in FIG. 3, first, a user operates the information terminal 200 to select digital information that is to be incorporated into the work surface 2 (S100). One or a plurality of pieces of digital information may be incorporated. In the left side of FIG. 5, a photograph is taken as an example of digital information, to illustrate an exemplary operation for incorporating a photograph of the information terminal 200 into the work surface 2 of the extended work space. In this example, the photograph 300 of the incorporation target is displayed on the screen of the information terminal 200, to enable the incorporation target to be selected. Note that, when incorporating a plurality of photographs, a user performs an operation for deciding incorporation targets (for example, pressing a screen image for a long period to display an incorporation target decision button and pressing the button, etc.) with the information terminal 200.

After selecting digital information of the incorporation target, a user puts the information terminal 200 on the work surface in the extended work space 2, as the operation for instructing incorporation of digital information (S102). In the example of the left side of FIG. 5, a user puts the information terminal 200 on the tabletop of the work surface 2. When the information recognition display device 100 recognizes that a user puts the information terminal 200 on the work surface 2, the digital information of the incorporation target is incorporated in the work surface 2 in response to display control triggering information created by putting the information terminal 200 on the work surface 2 (S104). A method for determining that an incorporation action of digital information is performed can be, for example, a method using an image recognition technology, a method using a time stamp, or the like.

In the method using an image recognition technology, first, the imaging unit 130 of the information recognition display device 100 takes an image of digital information displayed on the information terminal 200, and the analysis unit 142 recognizes the captured image of digital information. For example, the image recognition is performed by registering in advance, in the information recognition display device 100, registered images corresponding to digital information displayed on the information terminal 200, and matching the image captured by the imaging unit 130 to the registered image. Besides, digital information of the incorporation target may be recognized, for example, by identifying a two-dimensional bar code such as a QR code (registered trademark) displayed on the information terminal 200, or identifying a time-series lighting pattern of the screen image of the information terminal 200. Information that is to be acquired in advance for image recognition is recorded in the setting storing unit 148 of the image recognition display device 100.

On the other hand, in the method using a time stamp, the incorporation action may be determined from a temporal difference between a time stamp of a time point when the information terminal 200, of which the motion is detected, stops its motion ("motion-stop determination time point") and a time stamp of a motion-stop determination time point acquired by the detection unit 120. Note that the inside clocks of the information terminal 200 and the information recognition display device 100 are synchronized in advance. Alternatively, a temporal difference of the inside clocks are measured in advance, and one of the time stamps is corrected by the temporal difference. Also, in addition to the comparison of the time stamps, the analysis unit 142 may calculate a normalized cross-correlation between the motion information recognized by the information terminal 200 and the motion information of the information terminal 200 recognized by the information recognition display device 100, so that the execution of the incorporation action may be determined on the basis of the time difference at which the correlation value is highest.

In addition to such execution determination of the incorporation action of digital information, the analysis unit 142 determines whether or not the information terminal 200 has contacted the work surface 2 from the detection result of the detection unit 120. If it is determined that the information terminal 200 has contacted the work surface 2 on the basis of the analysis result of the analysis unit 142, and the digital information of the incorporation target is identified from image recognition, the operation deciding unit 144 starts the incorporation process of the digital information to the work surface 2 (S106).

Specifically, the digital information of the incorporation target is transmitted from the information terminal 200 via the communication unit, to the information recognition display device 100. When the main body of the information terminal 200 does not store the digital information of the incorporation target, the digital information may be transmitted from the server or the like that stores the digital information to the information recognition display device 100. Also, the information recognition display device 100 may be configured without the main body of the information recognition display device 100 that stores digital information, but digital information may be stored in a server connected via a network in a communicable manner, likewise the information terminal 200. In this case, the information terminal 200 transmits digital information of the incorporation target to a server that stores digital information of the information recognition display device 100.

In step S106, digital information of the incorporation target is displayed on the work surface 2 of the extended work space, to show that digital information is transferred from the information terminal 200 to the work surface 2. When the operation deciding unit 144 starts an incorporation process of digital information, the display control unit 146 acquires digital information from the device that stores digital information of the incorporation target in response to the start of the process. The digital information of the incorporation target is stored in the server or the like capable of communicating via the information terminal 200 or a network, and the operation deciding unit 144 is connected to the network via the communication unit 150 to acquire digital information of the incorporation target.

Then, the display control unit 146 causes the projection unit 110 to project the acquired digital information (S108). In this way, digital information of the information terminal 200 is incorporated in the extended work space. For example, in the example of the left side of FIG. 5, image recognition of the photograph 300 displayed on the screen of the information terminal 200 put on the tabletop is normally executed, and the information terminal 200 put on the tabletop is recognized. In this case, the photograph is transmitted from the information terminal 200 to the information recognition display device 100, so that the projection unit 110 projects the photograph on the tabletop. The photograph displayed on the information terminal 200 is displayed on the tabletop when a user lifts the information terminal 200 from the tabletop, a user can recognize that the photograph of the information terminal 200 is incorporated in the extended work space.

In the above, the incorporation process of digital information has been described. Note that incorporation of digital information from the information terminal 200 to the work surface 2 of the extended work space may be a copy of the information terminal 200 to the information recognition display device 100, or a move of digital information of the information terminal 200 to the information recognition display device 100. When digital information of the information terminal 200 is moved to the information recognition display device 100, only digital information may be displayed on the work surface 2, and the information terminal 200 does not display digital information. Also, when digital information of the information terminal 200 is moved to the information recognition display device 100, the information terminal 200 may display the display information that expresses digital information of the information terminal 200 that has moved to the information recognition display device 100. Thereby, a user can intuitively recognize that the digital information is moved from the information terminal 200. Such display control of the information terminal 200 is achieved by transmitting the information for changing the display of the information terminal 200 from the information recognition display device 100 to the information terminal 200, at a time in response to the incorporation process of digital information. When removing digital information displayed on the work surface 2 with the information terminal 200, the same or similar display process may be executed. As illustrated in the right side of FIG. 5, the display of digital information may be erased from the work surface 2 when the digital information is removed to the information terminal 200, and the digital information may be displayed on the work surface 2 when digital information is transferred to the information terminal 200. Further, the digital information incorporated from the information terminal 200 to the work surface 2 of the extended work space is freely operated (edited, moved, etc.) on the work surface 2. A specific example of the operation method performable on the work surface 2 of the extended work space will be described later.

(2) Digital Information Removal Process

Next, on the basis of FIGS. 4 and 5, the process for removing digital information displayed on the work surface 2 of the extended work space with the information terminal 200 will be described. In the right side of FIG. 5, a photograph is taken as an example of the digital information, to illustrate an exemplary operation for removing the photograph of the work surface 2 of the extended work space with the information terminal 200.

First, a user decides digital information that is to be removed with the information terminal 200, from among the digital information displayed on the work surface 2 of the extended work space. Then, the user puts the information terminal 200 on the digital information that is decided as the removal target, as an action for removing digital information from the work surface 2, (S110). In an example of the right side of FIG. 5, a user adds a character string as an additional object 402 to the photograph 400 displayed on the work surface 2 of the extended work space, and thereafter puts the information terminal 200 on the photograph 400. If the information recognition display device 100 recognizes that the user has put the information terminal 200 on the work surface 2 (S112), the digital information of the removal target is moved from the work surface 2 to the information terminal 200 in response to display control triggering information created by putting the information terminal 200 on the work surface 2 (S114).

At this time, the digital information content displayed on the work surface 2 at the time point when the information terminal 200 is put is moved to the information terminal 200. For example, in an example of the right side of FIG. 5, the photograph 400 to which the additional object 402 is added is moved to the information terminal 200. Note that the method for determining that the removal action of digital information is performed is, for example, the aforementioned method using the image recognition technology, the method using the time stamp, or the like. At this time, in the method using the time stamp, the action is determined using the time stamp at the time point when the information terminal 200 starts moving from a motionless state, as opposed to the aforementioned information terminal 200 that determines the time point when the information terminal 200 stops its motion.

Thereafter, when it is detected that the information terminal 200 is lifted from the work surface 2 by the user, the operation deciding unit 144 causes the display control unit 146, to erase the display of digital information moved to the information terminal 200 from the work surface 2 (S116).

Figure 5:
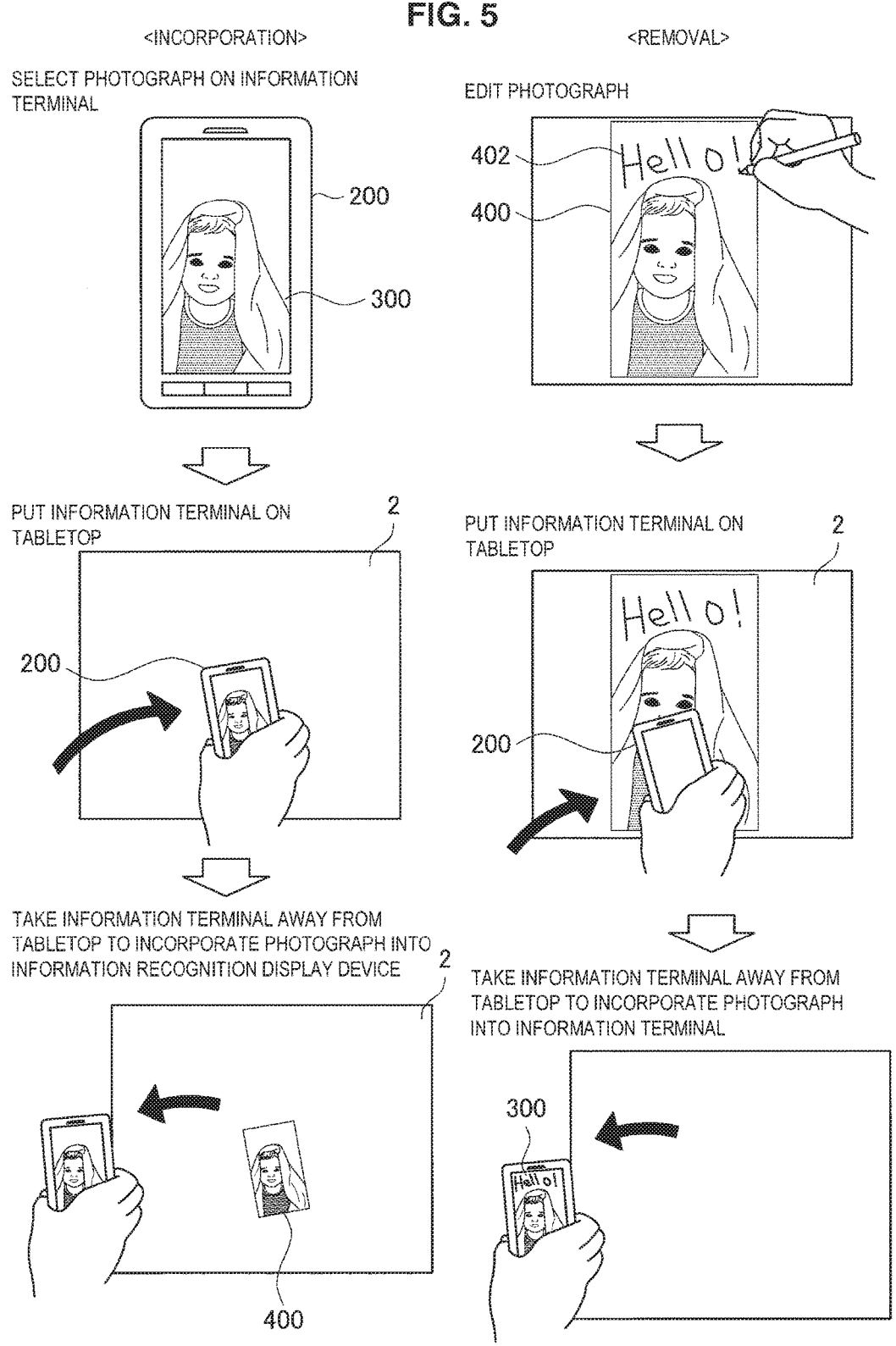
FIG. 5 is an explanatory diagram for describing a photograph transferring process performed between a work surface in an extended work space and an information terminal.

For example, in an example of the right side of FIG. 5, when a user lifts the information terminal 200 put on the tabletop, the display control unit 146 erases the display of the photograph 400 of the removal target displayed at the position where the information terminal 200 has been put on the work surface 2. Thereby, a user can visually confirm that the photograph 400 of the removal target is moved to the information terminal 200. Also, the information terminal 200 displays the photograph content after edition displayed on the work surface 2 before the photograph 400 is removed. In the above, the removal process of digital information has been described. Although, in the above description, digital information is incorporated in and removed from the work surface 2 in response to the display control triggering information created by the motion of the information terminal 200, the display control triggering information may be created by the state in which the information terminal 200 is put on the work surface 2.

(3) Operation of Digital Information in Extended Work Space

Figure 6:
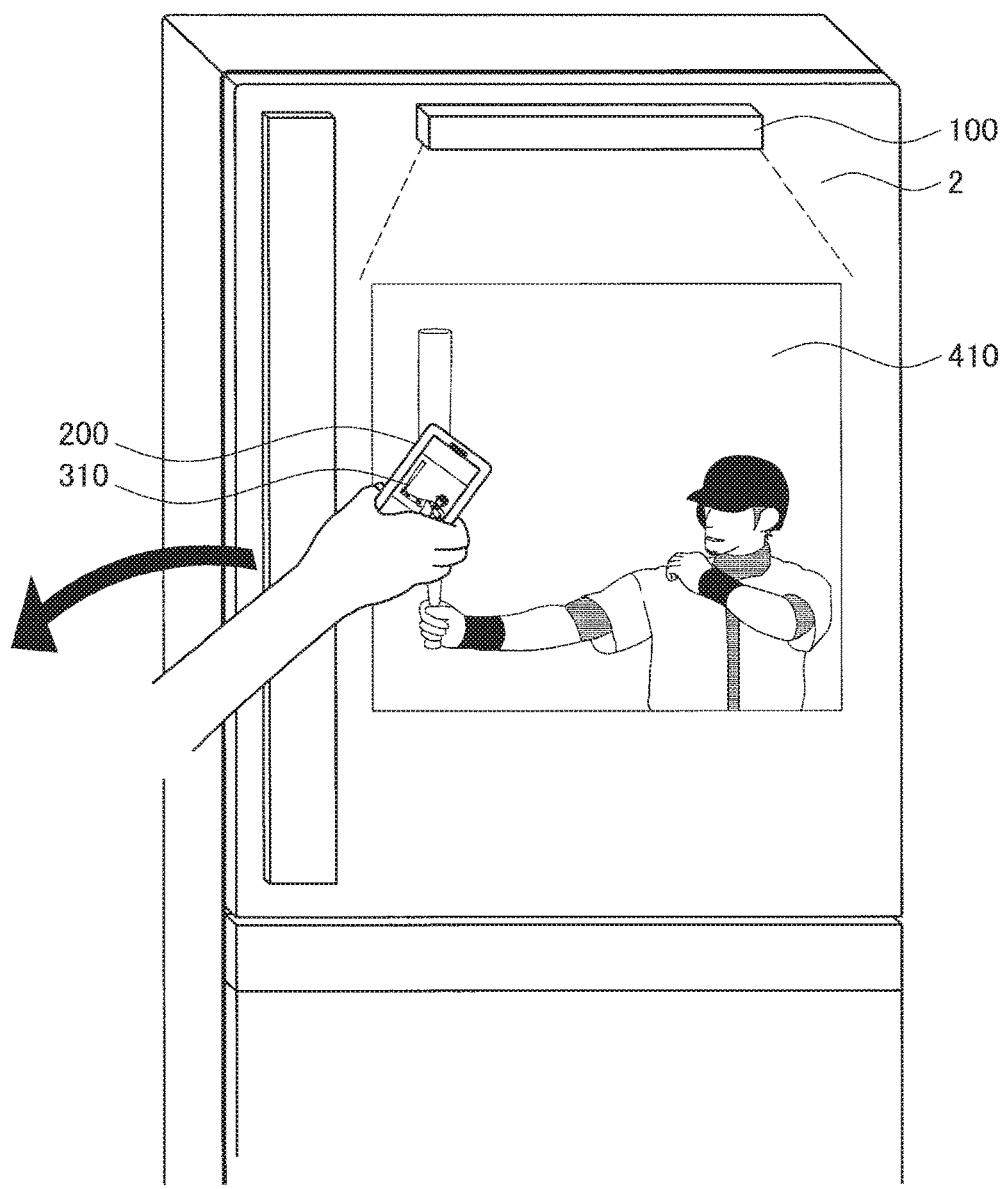
FIG. 6 is an explanatory diagram illustrating an example in which a door of a refrigerator is utilized as a work surface of an extended work space.

As described above, transfer of the digital information between the information recognition display device 100 that controls digital information in the extended work space and the information terminal 200 makes it possible to operate digital information at various sites in response to work method and utilization state of digital information. For example, as illustrated in FIG. 6, a door of a refrigerator may be utilized as the work surface 2 in the extended work space. In the example of FIG. 6, the information recognition display device 100 is installed in the door of the refrigerator. When the information terminal 200 that is activating a moving image application, such as news, is brought in touch with the door of the refrigerator, the moving image application is incorporated from the information terminal 200 into the information recognition display device 100. In this way, a user can operate the moving image application displayed on the door of the refrigerator to watch the news.

Synchronization of Digital Information

The digital information that is able to be handled in the work in the extended work space may be synchronized with the digital information of the information terminal 200 from which the digital information is acquired, or may be handled as independent information without synchronization. When the digital information displayed in the extended work space and the digital information of the information terminal 200 are synchronized, edited content and operated content of digital information in the extended work space is reflected in the information terminal 200 in real time, for example. Also, as illustrated in FIG. 7, in the situation where the photograph 300a is displayed on the information terminal 200, and the photograph 400a corresponding to the photograph 300a is projected on the work surface in the extended work space 2, a finger is moved on the operation surface of the information terminal 200 to perform a slide operation. In response to this operation, the photograph 300a displayed on the information terminal 200 is slid to display the next photograph 300b on the information terminal 200, and the display is changed from the photograph 400a to the photograph 400b corresponding to the photograph 300b in the work surface 2 as well.

Utilization of Digital Information Associated with Real Object

Also, although the digital information is transferred between the information recognition display device 100 and the information terminal 200 in the above description, the information recognition display device 100 may recognize a real object, such as a book, a magazine, and a newspaper, and acquire digital information corresponding to the recognized real object aside from the information terminal 200. For example, when a magazine of the real object is put on the work surface in the extended work space 2, the image of the magazine captured by the imaging unit 130 is matched to the registered information in advance stored in the setting storing unit 150. At this time, an easily identifiable real object part, such as a front cover, may be used to recognize the real object. When determining that the image of the magazine is identical with certain registered information, the analysis unit 142 causes the operation deciding unit 144 to acquire the digital information associated with the registered information (i.e., digital information of the recognized magazine) via a network. The acquired digital information of the magazine is projected on the work surface 2 by the projection unit 110 via the display control unit 146.

The digital information of the magazine displayed on the work surface 2 is operated by user's gesture for operating digital information to the work surface 2, in the same way as the operation in the information terminal 200. For example, as illustrated in FIG. 8, when the digital information of the magazine 420 is displayed on the work surface 2, a user slides a finger in the region where the digital information 420 is displayed, in order to turn a page of the magazine displayed in the digital information 420 in response to the slide direction. As described above, a real object in the extended work space may be recognized, so that the digital information associated with the recognized information is displayed on the work surface 2 of the extended work space, in order to make the digital information operable.

Digital information may be displayed in response to the identification of the two-dimensional bar code provided on the real object, as another example of recognizing a real object in the extended work space to display the digital information associated with the recognized information on the work surface 2 of the extended work space. FIG. 9 illustrates two examples of answer displaying method for problems in arithmetic. In the example of the left side of FIG. 9, when a finger slides on an answer sheet 430 put on the work surface 2 of the extended work space, answers are displayed on the answer sheet 430. In this example, an action of sliding a finger is an answer display instruction, and the operation deciding unit 144 displays the answers corresponding to the problems of the answer sheet 430 on the answer sheet 430 on the basis of the content of the answer sheet 430 recognized by the analysis unit 142 and a user's action in the extended work space.

Alternatively, in an example of the right side of FIG. 9, the answers may be displayed by putting the sheet 500 on which a two-dimensional bar code 502 indicating an answer display instruction is described, on the answer sheet 430 put on the work surface 2 of the extended work space. The information recognition display device 100 identifies the two-dimensional bar code of the sheet 500, and displays the answers of the problems on the sheet 500. The two-dimensional bar code 502 of the sheet 500 may be provided for each problem, or may be common for a plurality of problems.

As described above, the operation for displaying digital information associated with the real object in the extended work space is utilized, for example, for recognizing an advertisement of a supermarket to display detailed information of each article, or for recognizing display of a trailer of a movie to play a moving image.

Incorrect Operation Preventing Process

Transfer of the digital information between the information recognition display device 100 and the information terminal 200 is executed in response to an action of putting and leaving the information terminal 200 on the work surface 2. Here, since the action of putting the information terminal 200 on the tabletop or the like is an action that is frequently performed, it is possible that an incorporation action and a removal action is recognized to be performed, and unintended transfer of digital information is executed, even when transfer of digital information is not intended. Thus, unintended transfer of digital information may be prevented by performing an action that clearly expresses transfer of digital information.

Figure 10:
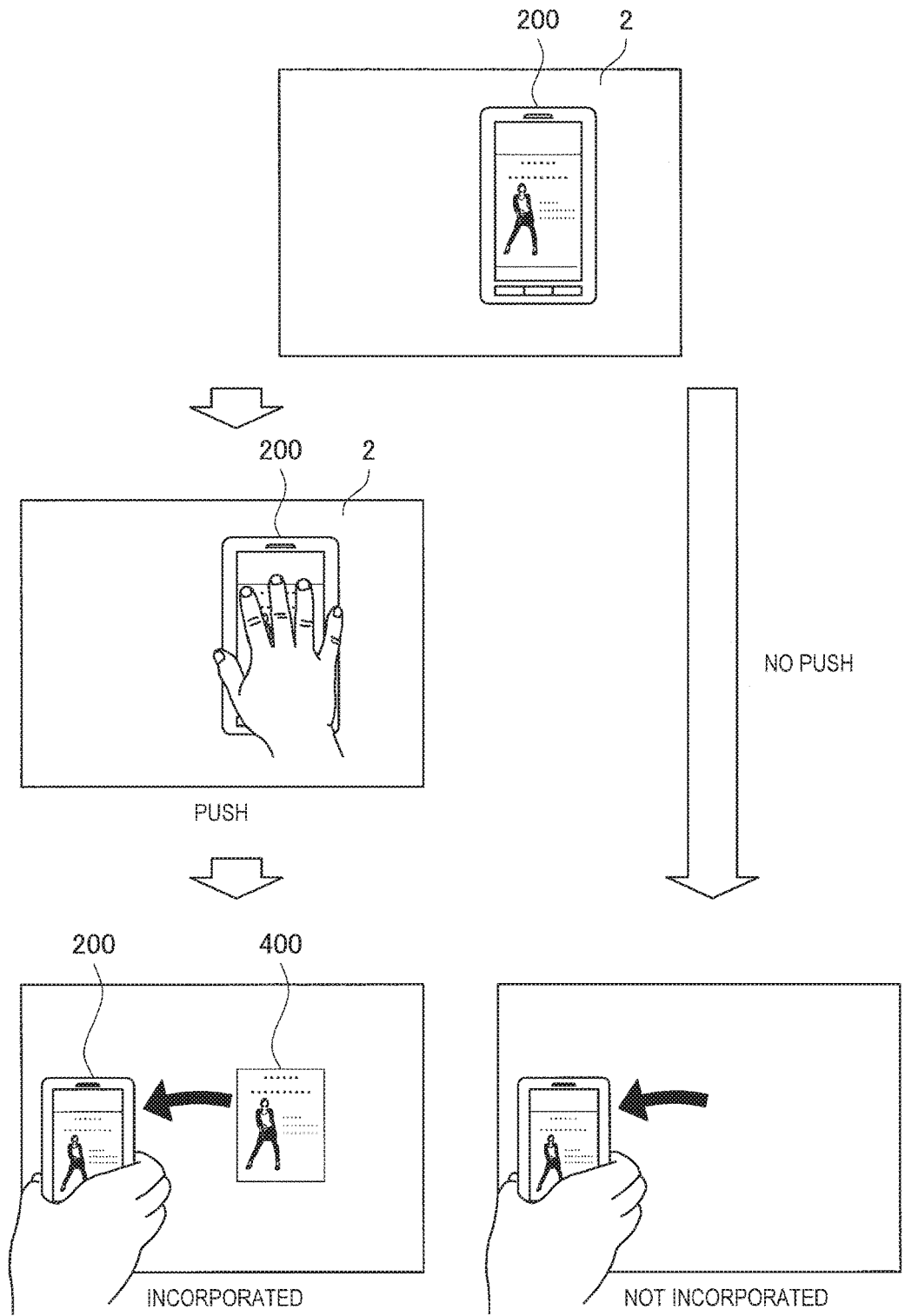
FIG. 10 is an explanatory diagram for describing an operation for preventing an incorrect operation of transfer of digital information.

For example, as illustrated in FIG. 10, the information terminal 200 is put on the work surface 2 of the extended work space. As for incorporation of digital information from the information terminal 200 into the information recognition display device 100, in the flowchart illustrated in FIG. 3, when the information terminal 200 put on the work surface 2 is lifted, the digital information of the incorporation target is incorporated into the information recognition display device 100. At this time, to prevent unintended incorporation of digital information, for example, when an action of pushing the information terminal 200 put on the work surface 2 toward the work surface 2 is performed, incorporation of digital information into the information recognition display device 100 starts for the first time. When the pushing action toward the information terminal 200 is performed, and thereafter the information terminal 200 is recognized to be lifted, the digital information of the incorporation target is incorporated into the information recognition display device 100.

On the other hand, when the pushing action toward the information terminal 200 put on the work surface 2 is not performed, and the information terminal 200 is lifted, the digital information of the information terminal 200 is not incorporated in the information recognition display device 100. Accordingly, the digital information of the information terminal 200 is not displayed on the work surface 2 after the information terminal 200 is lifted.

Although, in the example illustrated in FIG. 10, the digital information transfer is instructed by a distinctive action for preventing an incorrect operation, gesture recognition and sound recognition may be combined, so that incorporation and removal of digital information are instructed with sound in the process of FIG. 3 or FIG. 4, for example.

In the above, the configuration of the extended work space system according to the first embodiment, as well as the transfer process of digital information executed in the extended work space, has been described. The present embodiment enables handling of digital information in an extended work space that integrates a real world and digital information by a simple and intuitive method.

<2. Second Embodiment>
[2.1. Remote Collaboration Function]

Next, with reference to FIG. 11, the function of the extended work space system according to the second embodiment of the present disclosure will be described. The extended work space system according to the present embodiment implements a function that shares information of a plurality of extended work spaces (also, referred to as "remote collaboration function").

One of the work performed in the extended work space is collaboration work via a network that connects extended work spaces located at remote positions to each other. For example, such collaboration work is realized by superimposing an image on a desk, which is a user's work space at a remote position, on a work space of another user, in order to provide each user with an extended work space. Here, it is desired that the extended work space for the collaboration work be constructed easily, and that the collaboration work be performed more readily and intuitively while confirming the situation of each other in the collaboration work space. Thus, the remote collaboration function enables a user to do user's own work while recognizing the work situation in another extended work space. FIG. 11 is an explanatory diagram illustrating the activation process of the remote collaboration function in the extended work space system according to the present embodiment.

Figure 11:
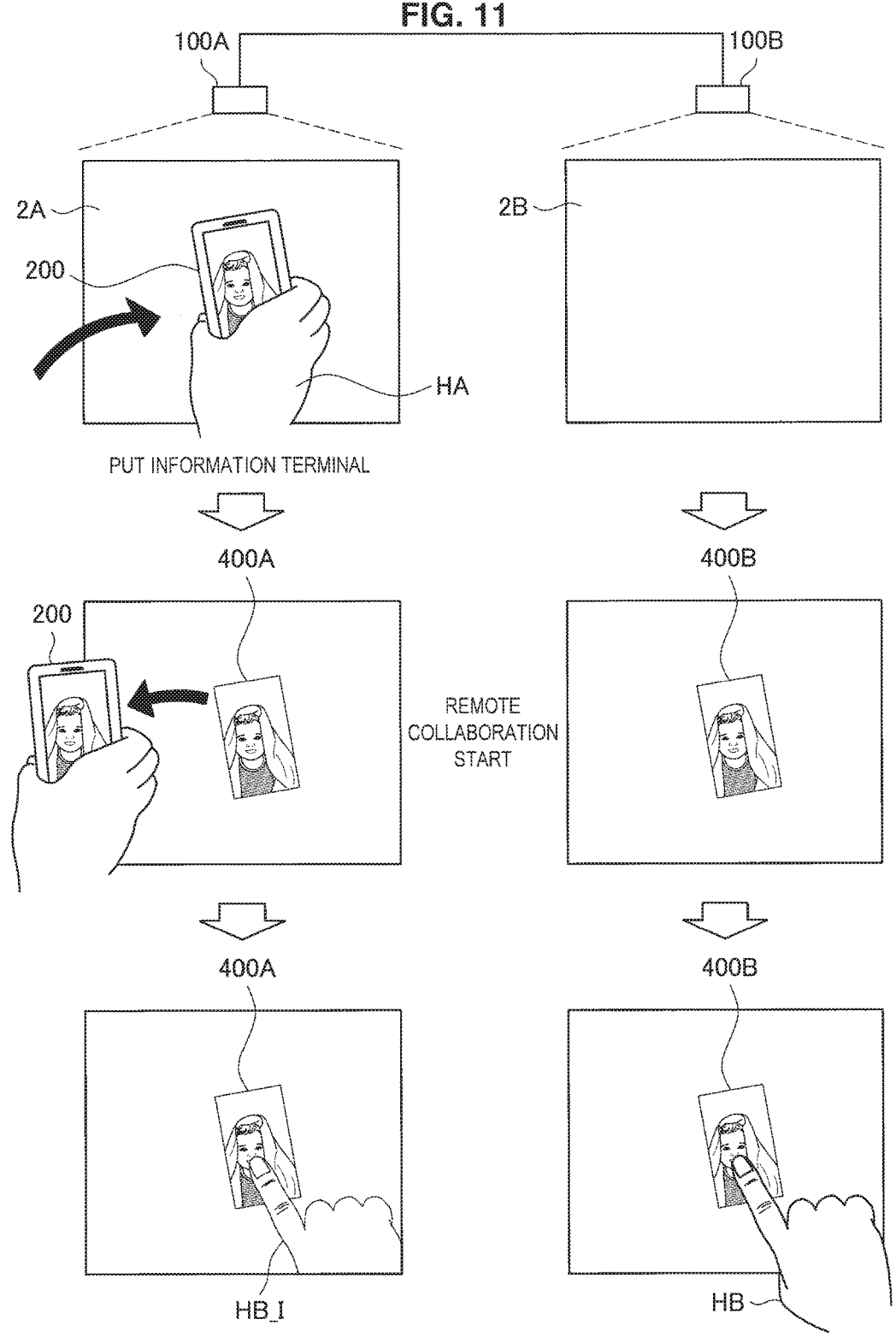
FIG. 11 is an explanatory diagram illustrating an activation process of a remote collaboration function in an extended work space system according to a second embodiment of the present disclosure.

FIG. 11 illustrates a procedure for sharing two extended work spaces. The extended work spaces are constructed by the information recognition display devices 100A, 100B installed in each space, respectively. Note that the function and configuration of the information recognition display devices 100A, 100B are same as those of the information recognition display device 100 according to the first embodiment illustrated in FIG. 2. The information recognition display devices 100A, 100B are in a communicable state via a network. Note that, in the following, the reference sign 100A is assigned to the first information recognition display device, and the reference sign 100B is assigned to the second information recognition display device. In the present embodiment, when it is detected that a user performs an action of putting and lifting the information terminal 200 on the work surface in the extended work space 2, information sharing with another extended work space starts. Thereby, information of a plurality of extended work spaces are made identical with each other with a simple action.

Specifically, the information terminal 200 is put on the work surface 2 of the extended work space in which the first information recognition display device 100A is installed, and thereafter is lifted. This action determination is executed, for example, by the method using the image recognition technology, the method using the time stamp, or the like, which are described in the first embodiment. When recognizing an action of putting and subsequently lifting the information terminal 200, the first information recognition display device 100A requests start of information sharing to the second information recognition display device 100B. In response to the request from the first information recognition display device 100A, the second information recognition display device 100B receives an image of a first extended work space in which the first information recognition device 100A is put, and displays in a second extended work space. In this way, the first extended work space is displayed as digital information in the second extended work space.

In the example illustrated in FIG. 11, when the information terminal 200 is put on the work surface 2A of the first extended work space, transfer of the digital information is executed between the information terminal 200 and the first information recognition display device 100A by the function described in the first embodiment. When the information terminal 200 is taken away from the work surface 2A, digital information incorporated from the information terminal 200, for example the photograph 400A, is displayed on the work surface 2A. At this time, since the remote collaboration function is active between the first information recognition display device 100A and the second information recognition display device 100B, the photograph 400A is displayed on the work surface 2B of the second extended work space, in the same way as the photograph 400A displayed in the first extended work space.

When the image of the first extended work space is displayed as digital information in the second extended work space, the image of the first extended work space is also displayed as the digital information in the first extended work space. For example, as illustrated in FIG. 11, when a user B of the second extended work space points a finger at the photograph 400B displayed on the work surface 2B, the image of a hand HB of the user B is output from the second information recognition display device 100B to the first information recognition display device 100A. Then, the hand of the user B is displayed as digital information HB_I in the first extended work space. Thereby, a user A of the first extended work space can recognize that the user B points the finger at the photograph 400B.

As described above, the remote collaboration function enables users to mutually recognize situation of a plurality of extended work spaces and a user's action, so that a plurality of users can proceed with one work while confirming intention of each other, for example.

Figure 12:
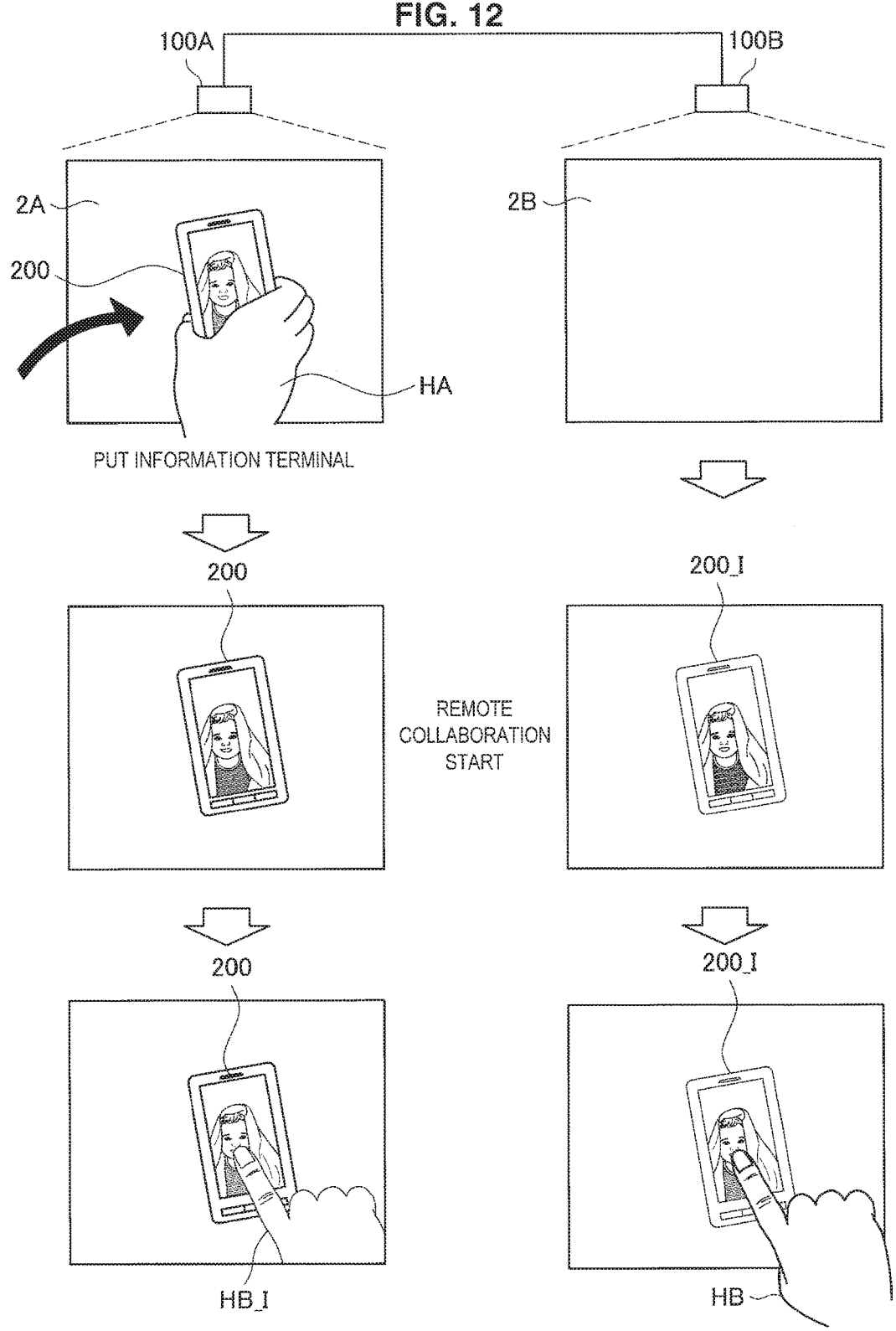
FIG. 12 is an explanatory diagram illustrating another example of an activation process of a remote collaboration function in an extended work space system according to the same embodiment.

Although, in the example of FIG. 11, the digital information 400A, 400B is displayed in each extended work space that shares the information, digital information of the real object of the information terminal 200 that is put on the work surface 2A of the first extended work space may be displayed in the second extended work space as illustrated in FIG. 12, for example. In this case, the remote collaboration function starts when the information terminal 200 is put on the work surface 2A, for example. When the remote collaboration function becomes active, the image of the information terminal 200 put on the work surface 2A is displayed on the work surface 2B of the second extended work space as digital information 200_I.

[2.2. Interactive Authentication Method]

For example, in the example of FIG. 11 described above, the remote collaboration function enables the user B of the second extended work space to perform an action, such as pointing a finger at the digital information and touching the digital information. At this time, the digital information stored by the first information recognition display device 100A may be operable in the second extended work space. In this case, the second information recognition display device 100B is also to store the digital information, which is transmitted to the second information recognition display device 100B from the first information recognition display device 100A at predetermined times. A predetermined time may be, for example, when the remote collaboration function starts, or when all users approve the operation of information.

Figure 13:
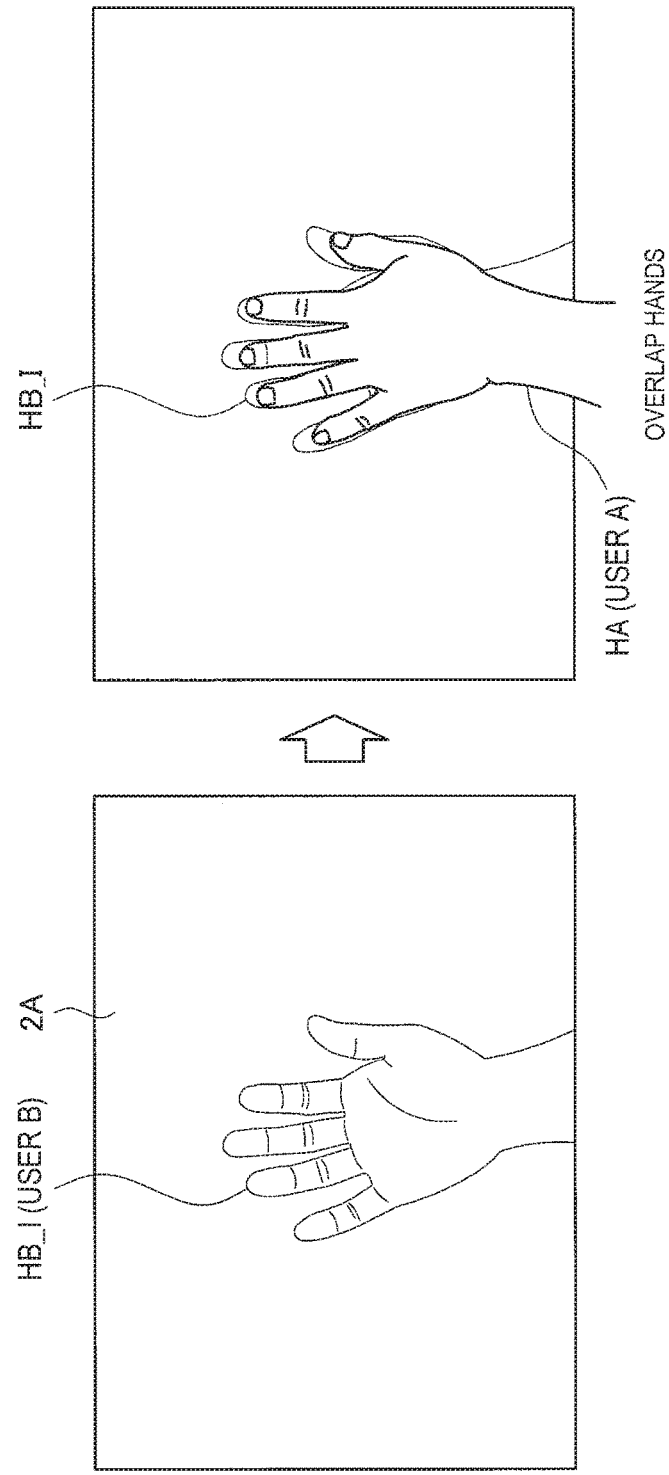
FIG. 13 is an explanatory diagram illustrating an example of an authentication method according to the same embodiment.

Approval between users may be confirmed using an authentication function. In the extended work space system according to the present embodiment, authentication can be performed by utilizing identical information of a plurality of extended work spaces. FIG. 13 illustrates an example of the authentication method according to the present embodiment. In this example, authentication is determined on the basis of overlap of a hand of each extended work space.

For example, a user (the user B) who requests authentication puts a hand on the work surface 2B of the extended work space with the palm facing upward, as an authentication requesting action. By doing so, the digital information HB_I of the hand of the user B is displayed in the extended work space of a user (the user A) who receives the authentication request. When receiving the authentication request of the user B, the user A puts the hand HA on the digital information HB_I of the hand of the user B displayed on the work surface 2A, so as to place the palms together. The information recognition display device 100A determines whether or not the hand HA of the user A and the hand HB_I of the user B overlap each other by hand shape recognition and, when determining the overlap, authenticates the request of the user B.

Figure 14:
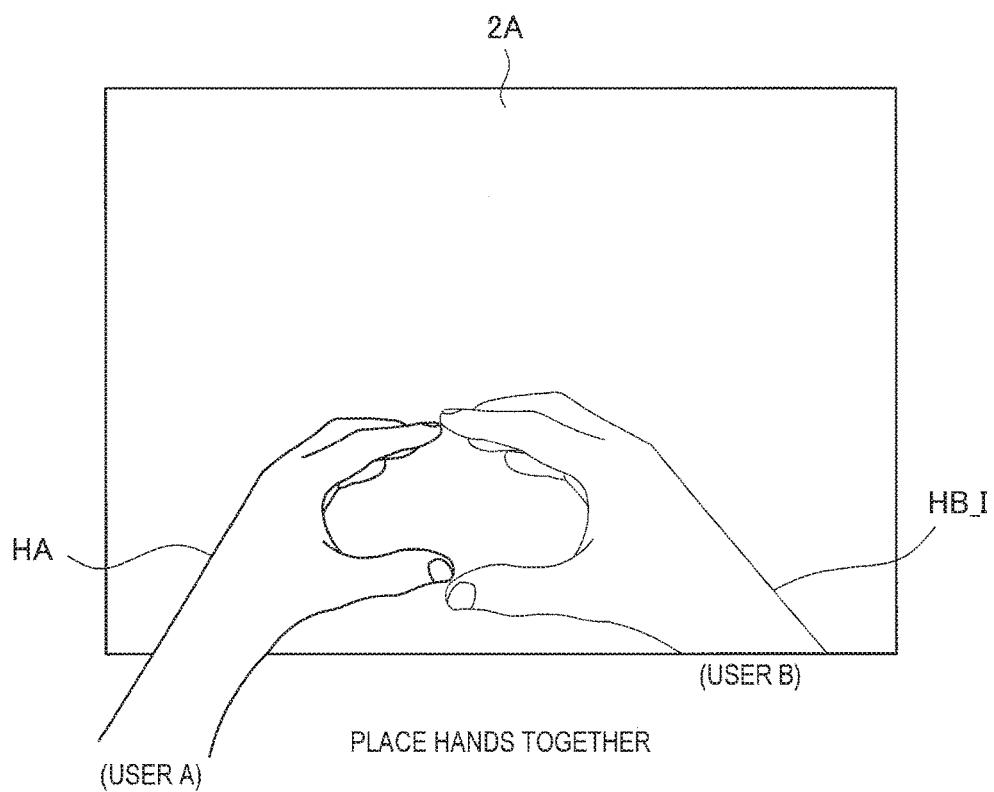
FIG. 14 is an explanatory diagram illustrating another example of an authentication method according to the same embodiment.

The authentication requesting action may be an action of placing a thumb and an index finger face-to-face with each other, as illustrated in FIG. 14 for example. In this case, a user (the user A) who receives an authentication request puts the hand HA in such a manner to place the user's own thumb and the index finger on the thumb and the index finger of the digital information HB_I of the hand of the user B, in order to respond to the authentication request.

Alternatively, the authentication action may be an action of placing fingers together in an instructed authentication region. For example, when an article in the game is exchanged as illustrated in FIG. 15, an article X is handed from the user A to the user B. At this time, an authentication guidance illustrated on FIG. 15 is displayed on the work surface 2A of the user A and the work surface 2B of the user B. The authentication guidance displays a message for confirming an approval, and recommends an action of touching a finger on an approval area 460 when approving. When each of the user A and the user B performs the authentication action in response to the message, the hand performing the authentication action is displayed in the extended work space of the other person. This enables performing the authentication action while looking at the motion of the other person, and the user A can perform the authentication action after confirming that the user B has approved as illustrated in FIG. 15, for example.

Figure 16:
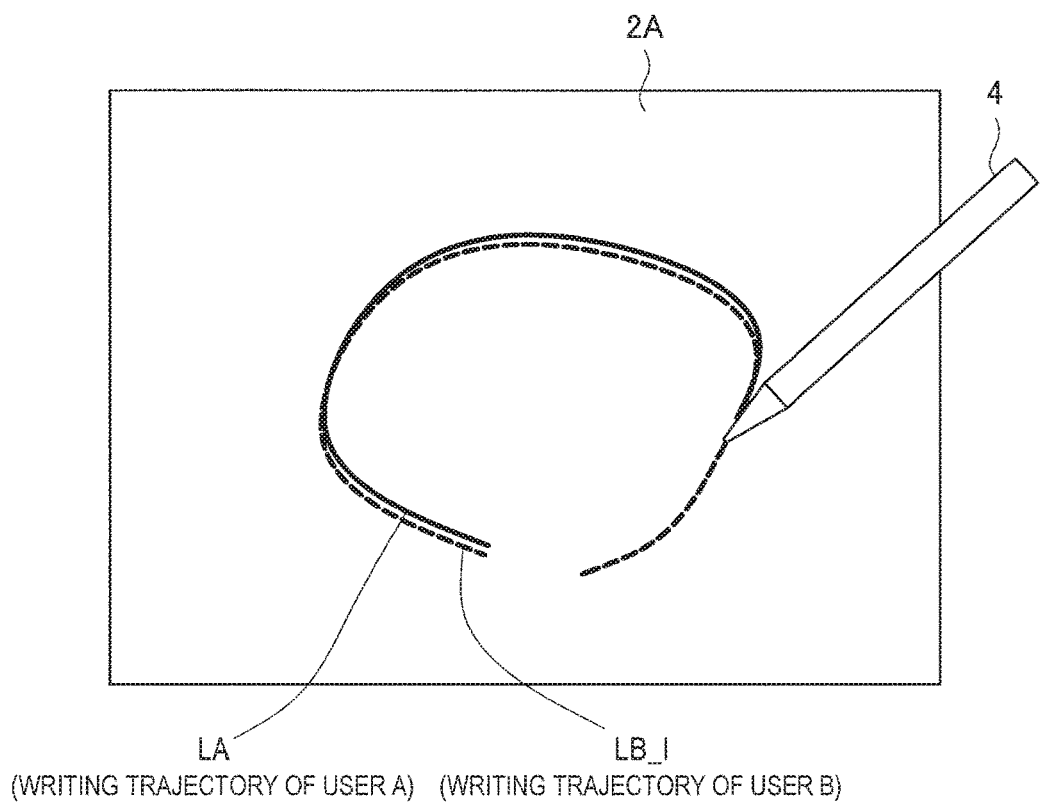
FIG. 16 is an explanatory diagram illustrating another example of an authentication method according to the same embodiment.

Further the authentication action may be an action of inputting, in another extended work space, the same information as the information input in a certain extended work space. For example, when a writing trajectory of a pen of a user is detectable, an authentication process that compares writing trajectories input in a plurality of extended work spaces and approves when identical may be executed. As one example, as illustrated in FIG. 16, one user (for example, the user B) inputs with a pen in the work surface 2B as an authentication requesting action. When acquiring the writing trajectory of the pen of the work surface 2B, the information recognition display device 100B outputs the writing trajectory information, along with the authentication request, to the information authentication display device 100A of the other user (for example, the user A).

The information authentication display device 100A receives the authentication request, and displays the digital information LB_I indicating the writing trajectory of the pen of the user B on the work surface 2A. When approving, the user A traces the digital information LB_I displayed on the work surface 2A with a pen 4, and inputs the same pictorial figure as the digital information LB_I. When determining that the writing trajectory of the pen 4 of the user A is same as the digital information LB_I, the information recognition display device 100A notifies the information authentication display device 100B that the user A has approved. Thereby, authentication succeeds between the user A and the user B.

As described above, the extended work space system according to the present embodiment executes the authentication process while confirming an authentication action of each user, taking advantage of sharable information of each extended work space. Hence, a user can perform the authentication process intuitively, and can proceed with the process while confirming the authentication action of each user in order to perform the authentication action without worries.

The behavior performed by the authentication may be various kinds of operations, such as sharing digital information between users, deleting digital information, and sharing digital information with a third person. For example, digital information stored in the first information recognition display device 100A of the user A is removed at the information terminal 200B of the user B of another extended work space. At this time, as an authentication action for permitting a removal of digital information in the information terminal 200B of the user B, an action of overlapping mutual information terminals on the digital information of the removal target may be performed.

Figure 17:
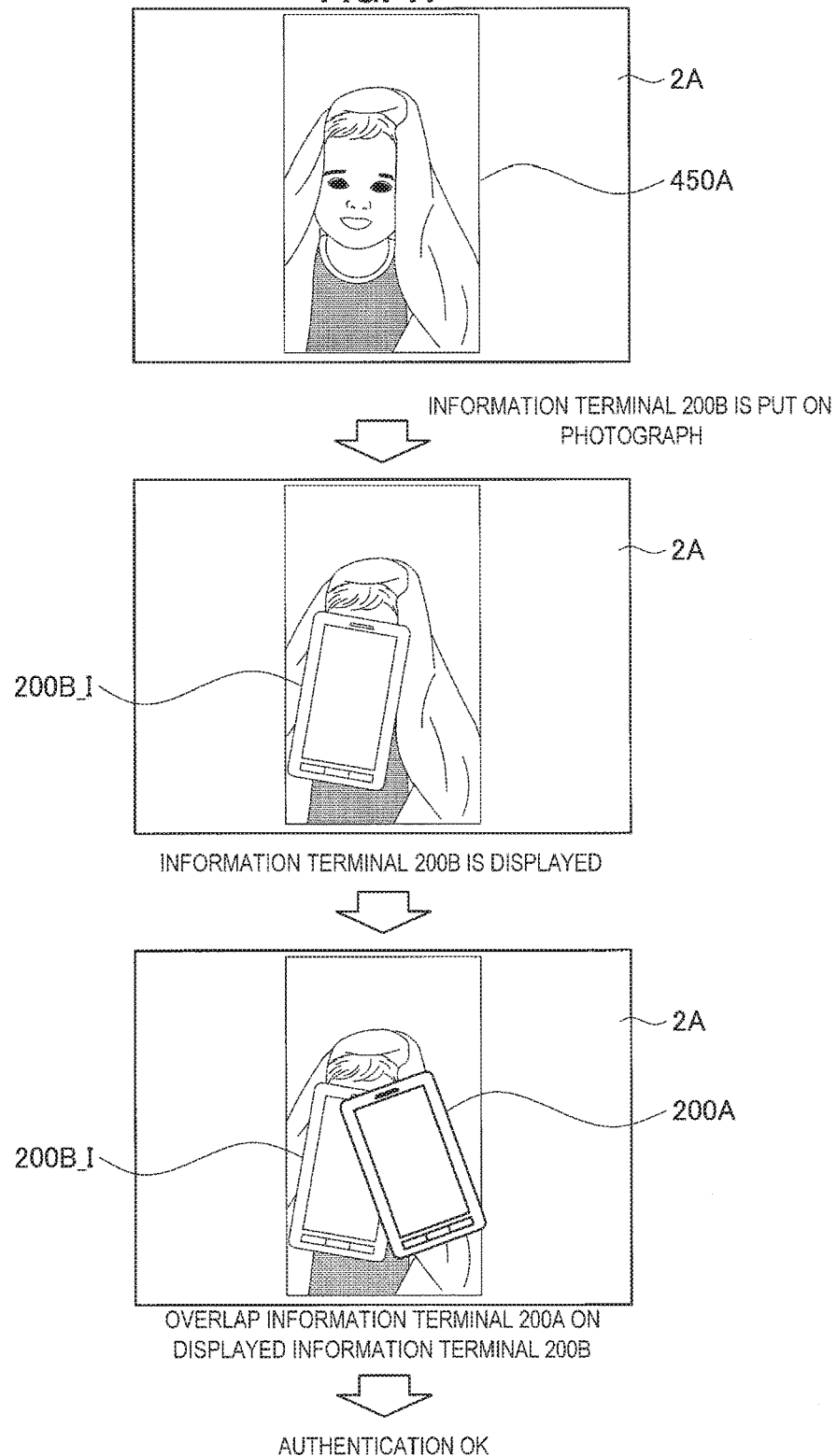
FIG. 17 is an explanatory diagram illustrating another example of an authentication method according to the same embodiment.

For example, as illustrated in FIG. 17, digital information of the photograph 450A is stored in the first information recognition display device 100A of the user A. The photograph 450A is also displayed on the work surface 2B of the user B of another extended work space, by the remote collaboration function. The user A is to permit when the photograph 450A is removed in the information terminal 200B of the user B, and the user B puts the information terminal 200B on the photograph displayed on the work surface 2B as the authentication requesting action. This action is displayed on the work surface 2A of the user A, and the user A looks at the action of the user B displayed on the work surface 2A to recognize a removal request of the photograph 450A.

Then, when approving the request of the user B, the user A overlaps the information terminal 200A of the user A on the digital information 200B_I of the information terminal 200B displayed on the work surface 2A. When determining that the user B has approved a removal of the information terminal 200B for the photograph 450A from the action of the user A, the first information recognition display device 100A sends the determination result to the second information authentication display device 100B. Thereby, the authentication succeeds between the user A and the user B, and the photograph 450A is copied to the information terminal 200B.

Figure 18:
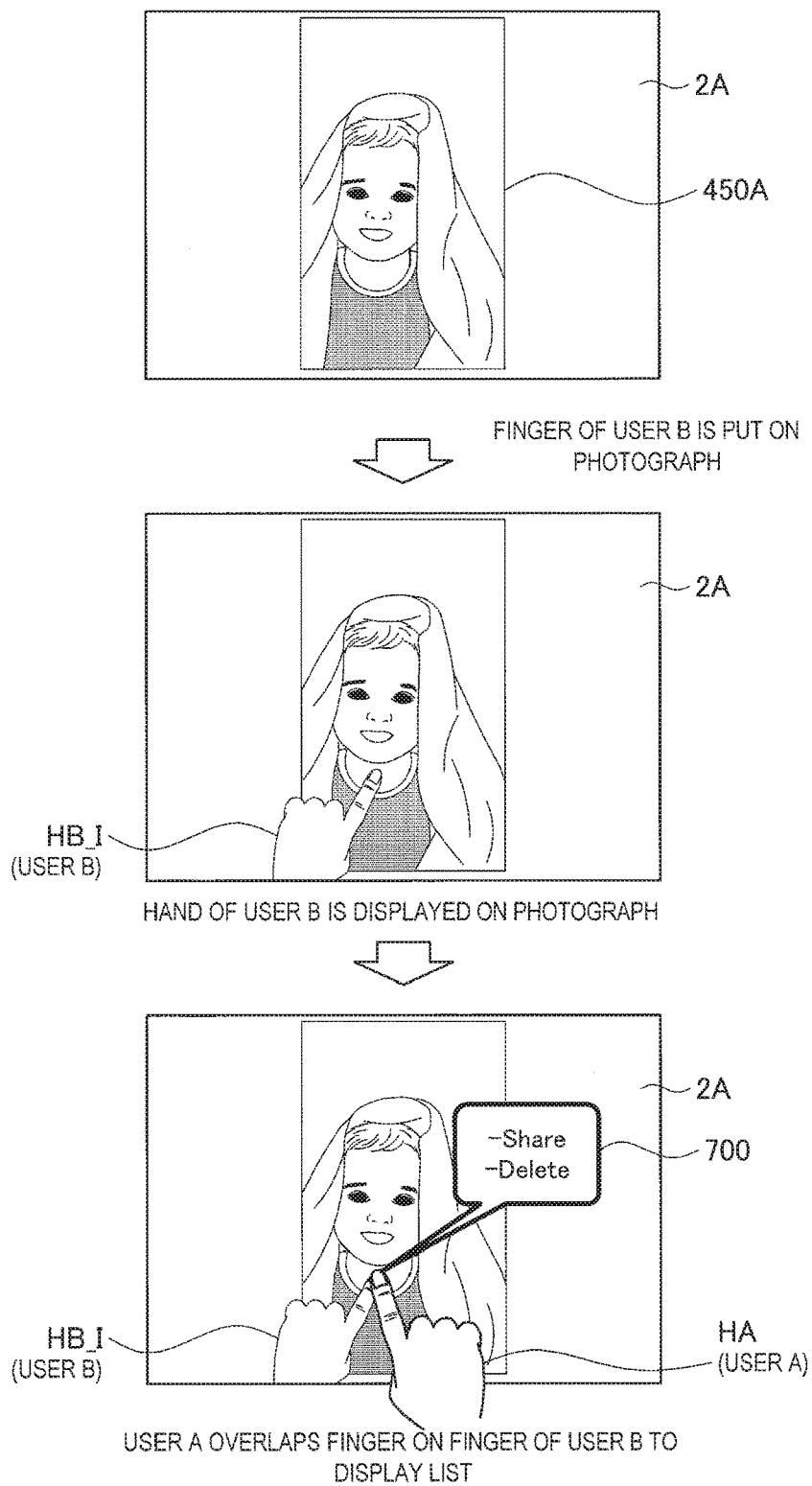
FIG. 18 is an explanatory diagram illustrating an example in which operable processes are listed when an authentication successes.

Also, when a plurality of operations is executable by the authentication action, operations executable when authentication between users succeeds may be displayed in a list, for example. In the example illustrated in FIG. 18, the photograph 450A stored in the first information recognition display device 100A of the user A is also displayed on the work surface 2B of the user B of another extended work space, by the remote collaboration function, in the same way as FIG. 17. When the user B puts a finger on the photograph displayed on the work surface 2B, and the user A also puts a finger of the user A on the finger of the user B, authentication succeeds between the user A and the user B. At this time, the first information recognition display device 100A displays a list 700 of operations executable when authentication between users succeeds, on the work surface 2A. This list 700 is also displayed on the work surface 2B of the user B.

The list 700 includes items such as sharing digital information (Share) and deleting digital information (Delete), for example. When the list 700 is displayed, a user that does not have stored digital information (the user B in the present example) is also able to execute sharing and deleting of digital information, which are operable.

Note that, when one item of digital information is operable between a plurality of users, it is possible that a plurality of users try to operate the digital information simultaneously. The digital information may be simultaneously operable, or may be operable by a specific user only. A method that enables operation of a specific user only may be an exclusion process, which permits an operation from a user who first performed an operation and excludes operations of other users until the operation of the first user ends, for example.

Figure 19:
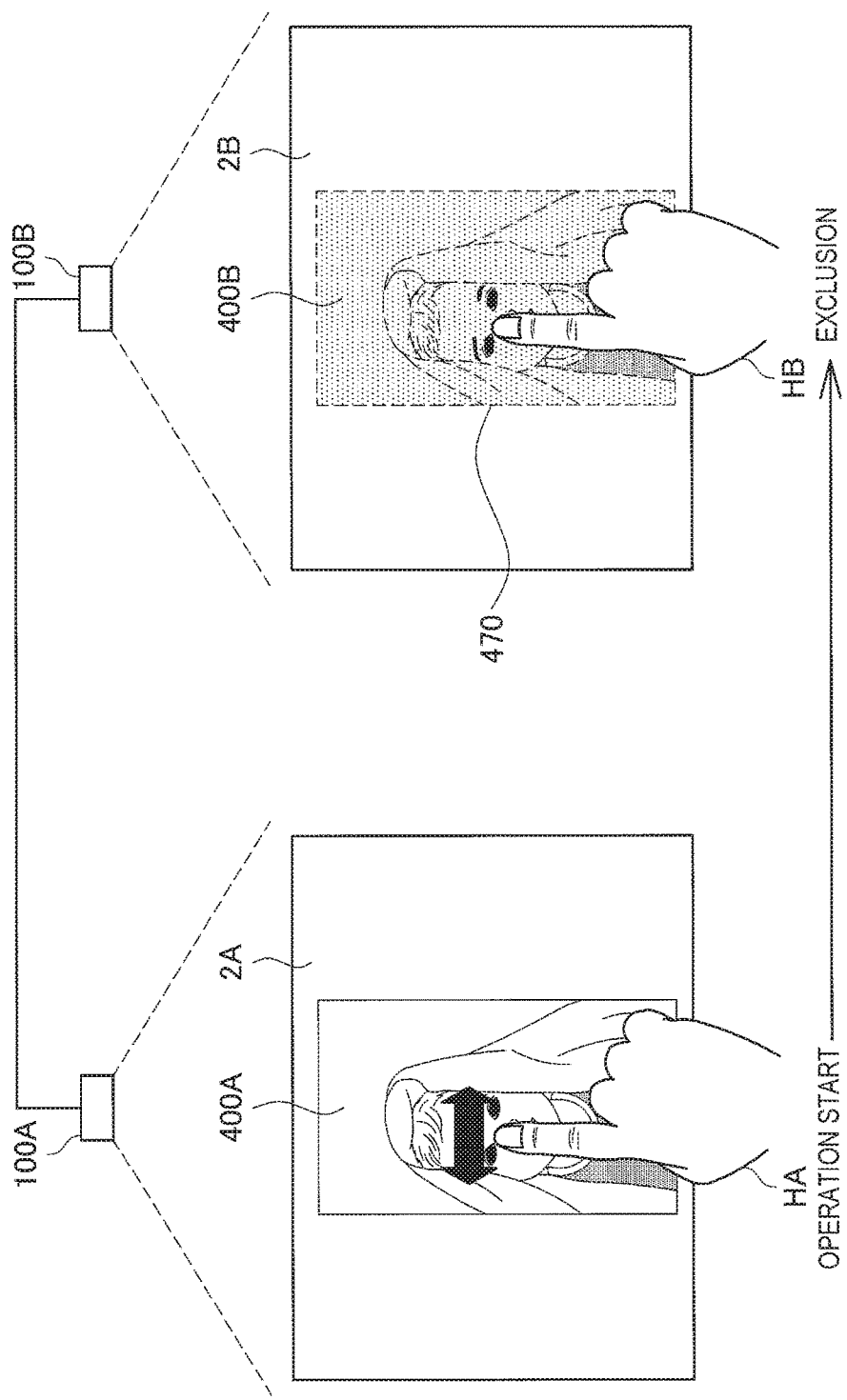
FIG. 19 is an explanatory diagram for describing an exclusion process to digital information.

For example, as illustrated in FIG. 19, when the remote collaboration function is active between the first information recognition display device 100A and the second information recognition display device 100B, the user A touches and operates the photograph 400A displayed on the work surface 2A with a finger. At this time, the first information recognition display device 100A instructs the second information recognition display device 100B to exclude an operation to the photograph 400B displayed on the work surface 2B of the user B. The second information recognition display device 100B receives the exclusion instruction, and excludes an operation to the photograph 400B. At this time, the user B may be notified that an operation to the photograph 400B is excluded. The notification method may be, for example, masking of the photograph 400B as in FIG. 19, sound, or the like.

In the above, the remote collaboration function of the extended work space system according to the present embodiment has been described. Such function enables mutually recognizing situations of a plurality of extended work spaces and user's actions, so that a plurality of users can proceed with one work while confirming intention of each other.

<3. Hardware Configuration Example>

Figure 20:
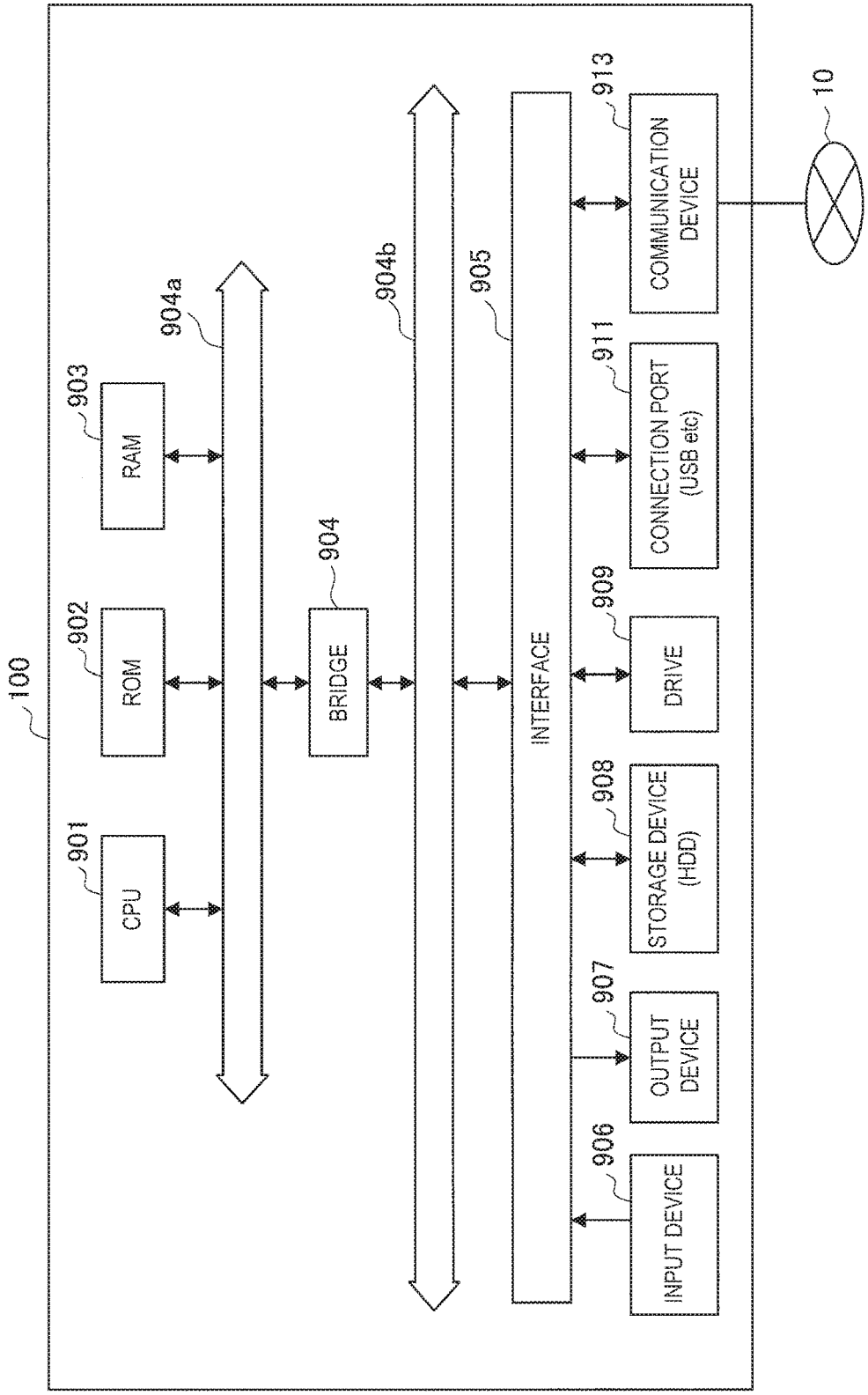
FIG. 20 is a block diagram illustrating a hardware configuration of an information processing unit.

The processing by the information processing unit 140 of the information recognition display device 100 according to the aforementioned embodiment can be executed by using hardware or software. In this case, the information processing unit 140 can be configured as illustrated in FIG. 20. Hereinafter, an example of a hardware configuration of the information processing unit 140 will be described based on FIG. 20.

The information processing unit 140 can be implemented by a processing apparatus such as a computer, as described above. As illustrated in FIG. 20, the information processing unit 140 includes a central processing unit (CPU) 901, a read only memory (ROM) 902, a random access memory (RAM) 903, and a host bus 904a. The information processing unit 140 also includes a bridge 904, an external bus 904b, an interface 905, an input device 906, an output device 907, a storage device (hard disk drive) 908, a drive 909, a connection port 911, and a communication device 913.

The CPU 901 functions as an arithmetic processing unit and a control unit, and controls overall operation of the information processing unit 140 according to a variety of programs. The CPU 901 may also be a microprocessor. The ROM 902 stores therein the programs, operational parameters, and the like that are used by the CPU 901. The RAM 903 temporarily stores therein the programs used and executed by the CPU 901, parameters appropriately varying in executing the programs, and the like. These are connected to each other through the host bus 904a configured of a CPU bus or the like.

The host bus 904a is connected to the external bus 904b such as a peripheral component interconnect/interface (PCI) bus through the bridge 904. Note that the host bus 904a, the bridge 904, and the external bus 904b do not have to be configured separately, and functions of these may be implemented by a single bus.

The input device 906 includes: an input unit for inputting information by a user, such as a mouse, a keyboard, a touch panel, buttons, a microphone, a switch, or a lever; an input control circuit generating input signals based on input by the user and outputting the signals to the CPU 901; and the like.

The output device 907 includes: a display device such as a liquid crystal display (LCD) device, an organic light emitting diode (OLED) device, or a lamp; and an audio output device such as a speaker.

The storage device 908 is an example of a storage unit of the information processing unit 140 and is a device for storing data. The storage device 908 may include a storage medium, a recorder that records data in the storage medium, a reader that reads data from the storage medium, a deletion device that deletes data recorded in the storage medium, and the like. The storage device 908 is configured of, for example, a hard disk drive (HDD). The storage device 908 drives a hard disk and stores programs executed by the CPU 901 and a variety of data.

The drive 909 is a reader/writer and is built in or externally connected to the information processing unit 140. The drive 909 reads information recorded in the removable recording medium loaded in the drive 909 such as a magnetic disk, an optical disk, a magneto-optical disk, or a semiconductor memory, and outputs the information to the RAM 903.

The connection port 911 is an interface connected to an external device, and is a port of connection with the external device capable of transferring data through, for example, an universal serial bus (USB). The communication device 913 is a communication interface configured of a communication device or the like for connecting to, for example, the communication network 10. The communication device 913 may be a communication device supporting a wireless local area network (LAN), a communication device supporting a wireless USB, or a wired communication device that performs wired communication.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although, in the above embodiments, the information processing unit 140 is provided in the information recognition display device 100, the present technology is not limited to such an example. For example, the information processing unit 140 or only a part of functions constituting the information processing unit 140 may be provided in a server that is connected to a network.

Additionally, the present technology may also be configured as below.

(1) An information processing apparatus, comprising:
circuitry configured to:
detect, an operation to display a virtual object on a first extended work space, based on position information of an information terminal in the first extended work space and first display control trigger information,
wherein a real object and the virtual object are operable in the first extended work space, and
wherein the first display control trigger information corresponds to change in the display of the virtual object; and
display, a content item as the virtual object on the first extended work space, based on a detection of contact of a trigger object with the information terminal that displays the content item,
wherein the information terminal is in the first extended work space.

(2) The information processing apparatus according to claim 1, wherein the circuitry is further configured to:
recognize the real object in the first extended work space as a control target; and
display the control target, on the first extended work space.

(3) The information processing apparatus according to claim 1, wherein the circuitry is further configured to:
capture an image of the first extended work space; and
determine the position information of the information terminal based on the captured image.

(4) The information processing apparatus according to claim 1, wherein the circuitry is further configured to:
detect motion of the information terminal in the first extended work space; and
control the display of the virtual object, based on the position information and the detected motion.

(5) The information processing apparatus according to claim 1,
wherein the position information indicates a position of the information terminal in the first extended work space, and
wherein the circuitry is further configured to:
detect contact of the information terminal with a surface in the first extended work space; and
display the virtual object on the first extended work space at the position, based on the detection of the contact of the information terminal.

(6) The information processing apparatus according to claim 2, wherein the circuitry is further configured to enable operation on the control target displayed on the first extended work space, based on motion of the trigger object on the first extended work space.

(7) The information processing apparatus according to claim 1, wherein the content item is selected by a user in the information terminal.

(8) The information processing apparatus according to claim 1, wherein the circuitry is further configured to:
communicate with a second extended work space, based on contact of the information terminal with a surface in the first extended work space; and
change the display of the virtual object in accordance with the second extended work space.

(9) The information processing apparatus according to claim 8, wherein the circuitry is further configured to:
determine a correspondence between a first action of a first user in the first extended work space and a second action of a second user in the second extended work space; and
approve an execution of a process based on the correspondence between the first action and the second action.

(10) The information processing apparatus according to claim 1, wherein the circuitry is further configured to:
display the content item in the first extended work space in synchronization with display of the content item on the information terminal; and
change the displayed content item in the first extended work space, based on an operation to change the displayed content item on the information terminal.

(11) The information processing apparatus according to claim 1, wherein the circuitry is further configured to edit the displayed content item in the first extended work space, based on an editing operation of the displayed content item on the information terminal.

(12) The information processing apparatus according to claim 1, wherein the circuitry is further configured to:

acquire a timestamp for one of a start of movement of the information terminal or a stop of the movement of the information terminal; and transfer the content item between the information processing apparatus and the information terminal based on the timestamp.

(13) The information processing apparatus according to claim 1, wherein the circuitry is further configured to transmit to the information terminal, second display control trigger information in response to the display of the virtual object, wherein the second display control trigger information corresponds to change in the display of the content item on the information terminal.

(14) An information processing method, comprising:

in a first information processing apparatus:

detecting, an operation to display a virtual object on a first extended work space, based on position information of an information terminal in the first extended work space and first display control trigger information, wherein a real object and the virtual object are operable in the first extended work space, and wherein the first display control trigger information corresponds to change in the display of the virtual object; and displaying, a content item as the virtual object on the first extended work space, based on a detection of contact of a trigger object with the information terminal that displays the content item, wherein the information terminal is in the first extended work space.

(15) The information processing method according to claim 14, further comprising:

recognizing the real object in the first extended work space as a control target; and displaying the control target, on the first extended work space.

(16) The information processing method according to claim 15, further comprising enabling an operation on the control target displayed on the first extended work space, based on motion of the trigger object on the first extended work space.

(17) The information processing method according to claim 14, further comprising:

communicating with a second extended work space, based on contact of the information terminal with a surface in the first extended work space; and changing the display of the virtual object in accordance with the second extended work space.

(18) The information processing method according to claim 17, further comprising:

determining a correspondence between a first action of a first user in the first extended work space and a second action of a second user in the second extended work space; and approving an execution of a process based on the correspondence between the first action and the second action.

(19) The information processing method according to claim 14, further comprising:

displaying the content item in the first extended work space in synchronization with display of the content item on the information terminal; and changing the displayed content item in the first extended work space, based on an operation to change the displayed content item on the information terminal.

(20) A non-transitory computer-readable storage medium having stored therein, computer-executable instructions for causing a computer to execute operations, the operations comprising:

detecting, an operation to display a virtual object on an extended work space, based on position information of an information terminal in the extended work space and display control trigger information, wherein a real object and the virtual object are operable in the extended work space, and wherein the display control trigger information corresponds to change in the display of the virtual object; and displaying, a content item as the virtual object on the extended work space, based on a detection of contact of a trigger object with the information terminal that displays the content item, wherein the information terminal is in the extended work space.

REFERENCE SIGNS LIST 2 work surface
100 information recognition display device
110 projection unit
120 detection unit
130 imaging unit
140 information processing unit
142 analysis unit
144 operation deciding unit
146 display control unit
148 setting storing unit
150 communication unit
200 information terminal

The invention claimed is:

1. An information processing apparatus, comprising:

circuitry configured to:

detect a first operation to display a virtual object on a first extended work space, wherein the first operation is detected based on position information of an information terminal in the first extended work space and first display control trigger information, wherein a real object and the virtual object are operable in the first extended work space, and wherein the first display control trigger information corresponds to a change in the display of the virtual object; and display a content item as the virtual object on the first extended work space, wherein the content item is displayed based on detection of a contact of a trigger object with the information terminal that displays the content item, and wherein the information terminal is in the first extended work space.

2. The information processing apparatus according to claim 1, wherein the circuitry is further configured to:

recognize the real object in the first extended work space as a control target; and display the control target on the first extended work space.

3. The information processing apparatus according to claim 2, wherein the circuitry is further configured to enable a second operation on the control target displayed on the first extended work space, wherein the second operation is enabled based on motion of the trigger object on the first extended work space.

4. The information processing apparatus according to claim 1, wherein the circuitry is further configured to:
  capture an image of the first extended work space; and
  determine the position information of the information terminal based on the captured image.

5. The information processing apparatus according to claim 1, wherein the circuitry is further configured to:
  detect motion of the information terminal in the first extended work space; and
  control the display of the virtual object, based on the position information and the detected motion.

6. The information processing apparatus according to claim 1,
  wherein the position information indicates a position of the information terminal in the first extended work space, and
  wherein the circuitry is further configured to:
   detect a contact of the information terminal with a surface in the first extended work space; and
   display the virtual object on the first extended work space at the position, based on the detection of the contact of the information terminal.

7. The information processing apparatus according to claim 1, wherein the content item is based on a user selection in the information terminal.

8. The information processing apparatus according to claim 1, wherein the circuitry is further configured to:
  communicate with a second extended work space, based on a contact of the information terminal with a surface in the first extended work space; and
  change the display of the virtual object based on the second extended work space.

9. The information processing apparatus according to claim 8, wherein the circuitry is further configured to:
  determine a correspondence between a first action of a first user in the first extended work space and a second action of a second user in the second extended work space; and
  approve execution of a process based on the correspondence between the first action and the second action.

10. The information processing apparatus according to claim 1, wherein the circuitry is further configured to:
  display the content item in the first extended work space in synchronization with display of the content item on the information terminal; and
  change the displayed content item in the first extended work space, based on a third operation to change the displayed content item on the information terminal.

11. The information processing apparatus according to claim 1, wherein the circuitry is further configured to edit the displayed content item in the first extended work space, based on an edit operation of the displayed content item on the information terminal.

12. The information processing apparatus according to claim 1, wherein the circuitry is further configured to:
  acquire a timestamp for one of a start of a movement of the information terminal or a stop of the movement of the information terminal; and
  transfer the content item between the information processing apparatus and the information terminal based on the timestamp.

13. The information processing apparatus according to claim 1, wherein the circuitry is further configured to transmit second display control trigger information to the information terminal,
  wherein the second display control trigger information is transmitted based on the display of the virtual object, and
  wherein the second display control trigger information corresponds to a change in the display of the content item on the information terminal.

14. The information processing apparatus according to claim 1, wherein the detection of the contact of the trigger object comprises detection of a contact of a hand with the information terminal placed on a surface in the first extended work space.

15. The information processing apparatus according to claim 14, wherein the contact of the hand comprises pushing the information terminal.

16. An information processing method, comprising:
  in a first information processing apparatus:
   detecting a first operation to display a virtual object on a first extended work space,
    wherein the first operation is detected based on position information of an information terminal in the first extended work space and first display control trigger information,
    wherein a real object and the virtual object are operable in the first extended work space, and
    wherein the first display control trigger information corresponds to a change in the display of the virtual object; and
   displaying a content item as the virtual object on the first extended work space,
    wherein the content item is displayed based on a detection of a contact of a trigger object with the information terminal that displays the content item, and
    wherein the information terminal is in the first extended work space.

17. The information processing method according to claim 16, further comprising:
  recognizing the real object in the first extended work space as a control target; and
  displaying the control target on the first extended work space.

18. The information processing method according to claim 17, further comprising enabling a second operation on the control target displayed on the first extended work space, wherein the second operation is enabled based on motion of the trigger object on the first extended work space.

19. The information processing method according to claim 16, further comprising:
  communicating with a second extended work space, based on a contact of the information terminal with a surface in the first extended work space; and
  changing the display of the virtual object based on the second extended work space.

20. The information processing method according to claim 19, further comprising:
  determining a correspondence between a first action of a first user in the first extended work space and a second action of a second user in the second extended work space; and
  approving execution of a process based on the correspondence between the first action and the second action.

21. The information processing method according to claim 16, further comprising:
  displaying the content item in the first extended work space in synchronization with display of the content item on the information terminal; and changing the displayed content item in the first extended work space, based on a third operation to change the displayed content item on the information terminal.

22. A non-transitory computer-readable storage medium having stored therein, computer-executable instructions for causing a computer to execute operations, the operations comprising:

detecting an operation to display a virtual object on an extended work space,
   wherein the operation is detected based on position information of an information terminal in the extended work space and display control trigger information,
   wherein a real object and the virtual object are operable in the extended work space, and
   wherein the display control trigger information corresponds to a change in the display of the virtual object; and
displaying a content item as the virtual object on the extended work space,
   wherein the content item is displayed based on a detection of a contact of a trigger object with the information terminal that displays the content item, and
   wherein the information terminal is in the extended work space.

* * * * *